(12) United States Patent
Kawada et al.

(10) Patent No.: US 8,806,163 B2
(45) Date of Patent: Aug. 12, 2014

(54) STORAGE SYSTEM AND STORAGE SYSTEM NETWORK

(75) Inventors: Takashi Kawada, Yokohama (JP); Yoshinari Shinozaki, Kawasaki (JP); Hidenori Yamada, Kita (JP)

(73) Assignee: Fujitsu Limited, Kawasaki (JP)

( * ) Notice: Subject to any disclaimer, the term of this patent is extended or adjusted under 35 U.S.C. 154(b) by 120 days.

(21) Appl. No.: 13/595,394

(22) Filed: Aug. 27, 2012

(65) Prior Publication Data
US 2013/0086344 A1 Apr. 4, 2013

(30) Foreign Application Priority Data

Oct. 4, 2011 (JP) .................. 2011-220069

(51) Int. Cl.
*G06F 12/00* (2006.01)
(52) U.S. Cl.
USPC .................... 711/162; 711/E12.069; 711/170
(58) Field of Classification Search
USPC .......................................................... 711/162
See application file for complete search history.

(56) References Cited

U.S. PATENT DOCUMENTS

| | | | |
|---|---|---|---|
| 5,734,818 A | 3/1998 | Kern et al. | |
| 2003/0051111 A1 | 3/2003 | Nakano et al. | |
| 2003/0105934 A1 | 6/2003 | Kimura et al. | |
| 2006/0212668 A1 | 9/2006 | Furukawa et al. | |
| 2010/0030986 A1 | 2/2010 | Shinozaki et al. | |
| 2011/0087850 A1 | 4/2011 | Kawada et al. | |
| 2011/0093742 A1 | 4/2011 | Shinozaki | |

FOREIGN PATENT DOCUMENTS

| | | |
|---|---|---|
| JP | 7-244597 | 9/1995 |
| JP | 2003-122509 | 4/2003 |
| JP | 2003-167683 | 6/2003 |
| JP | 2006-260292 | 9/2006 |
| JP | 2010-39574 | 2/2010 |
| JP | 2011-86006 | 4/2011 |
| JP | 2011-86160 | 4/2011 |
| WO | 2008/152691 A1 | 12/2008 |

*Primary Examiner* — Reginald Bragdon
*Assistant Examiner* — Hamdy S Ahmed
(74) *Attorney, Agent, or Firm* — Staas & Halsey LLP

(57) ABSTRACT

A storage system includes a first storage unit, a second storage unit and a controller to receive a write request for updated data to a first storage unit from the host and write the updated data into the first storage area, when the controller determines that there is not a free area in a storage area to be processed in the second storage unit, the controller changes the storage area to be processed to another storage area to be processed and instructs change of a storage area to be processed to another storage system to be connected to the host, and the controller reads the updated data from the first storage unit and transmits the updated data and writing destination information relating to the updated data to another storage system for backup.

6 Claims, 34 Drawing Sheets

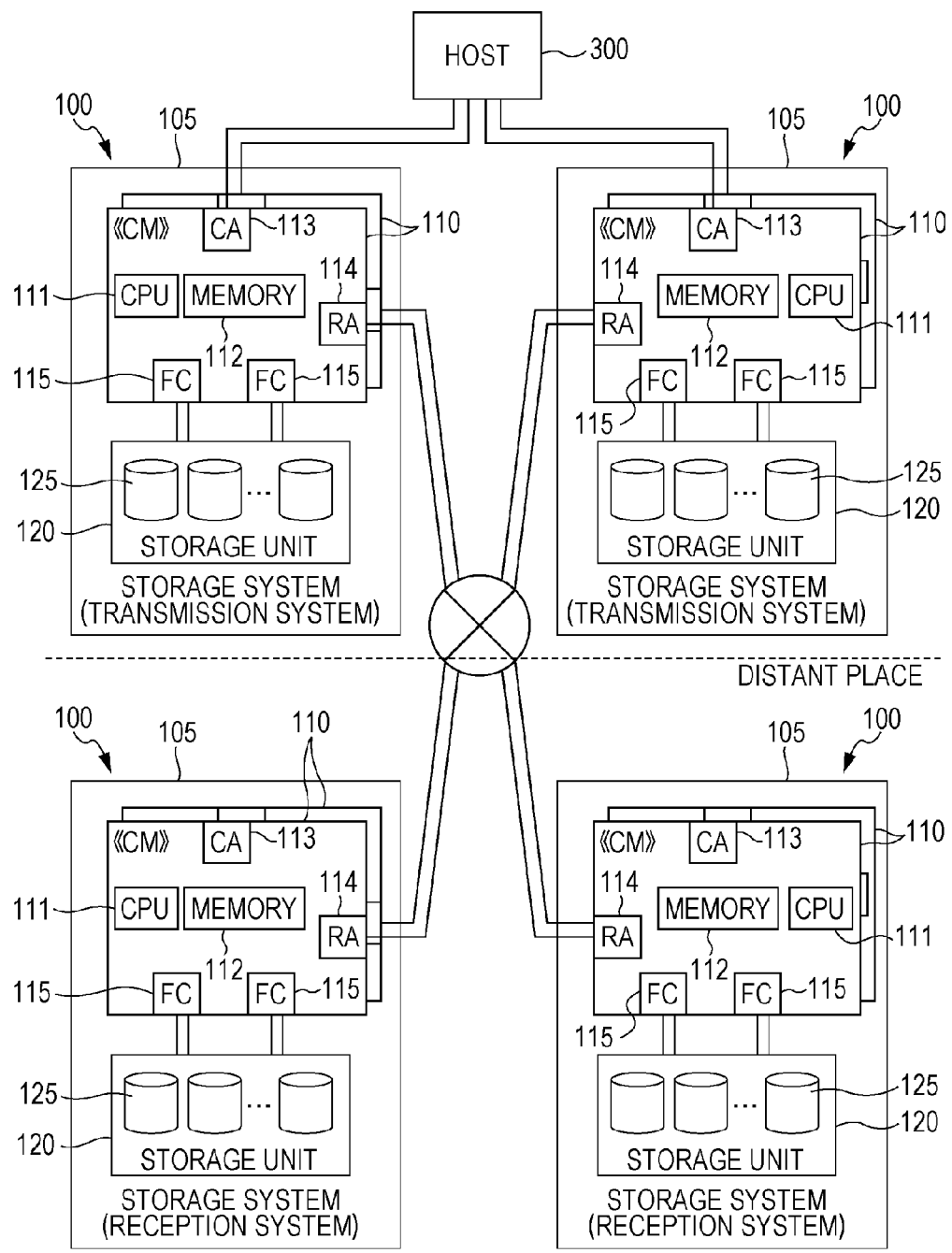

FIG. 3

| | | | 150 |
|---|---|---|---|
| GROUP ID | | | 0 |
| BUFFER SIZE (MB) | | | 8 |
| BUFFER MANAGEMENT TABLE SIZE (KB) | | | 12 |
| NUMBER OF TRANSMISSION SYSTEMS | | | 2 |
| NUMBER OF RECEPTION SYSTEMS | | | 2 |
| TRANSMISSION SYSTEM 0 | A | TRANSMISSION SYSTEM 0 GROUP ID | 0 |
| TRANSMISSION SYSTEM 1 | B | TRANSMISSION SYSTEM 1 GROUP ID | 2 |
| RECEPTION SYSTEM 0 | C | RECEPTION SYSTEM 0 GROUP ID | 0 |
| RECEPTION SYSTEM 1 | D | RECEPTION SYSTEM 1 GROUP ID | 1 |
| GROUP ID CORRESPONDENCE RELATION INFORMATION | | | 0 → 0 |
| GROUP ID CORRESPONDENCE RELATION INFORMATION | | | 2 → 1 |
| TRANSMISSION-SIDE TOTAL BUFFER SIZE (MB) | | | 64 |
| RECEPTION-SIDE TOTAL BUFFER SIZE (MB) | | | 64 |
| NUMBER OF BUFFER SETS | | | 8 |
| BUFFER SET AUTOMATIC SWITCHING TIME (sec) | | | 60 |
| BUFFER SET PERIODICAL SWITCHING PROCESSING ACTIVATED STATE | | | |
| NEGOTIATION STATE | | | BEFORE NEGOTIATION |
| STORAGE BUFFER SET NUMBER | | | |
| BUFFER SET SWITCHING STATE | | | |
| BUFFER SET SWITCHING REQUEST STATE | | | |
| BUFFER SET 0 USE STATE | | | |
| BUFFER SET 1 USE STATE | | | |
| ⋮ | | | |
| BUFFER SET 7 USE STATE | | | |
| BUFFER SET EMPTY WAITING STATE | | | |
| CM10 SWITCHING REQUEST ACCEPTED STATE | | | |
| CM11 SWITCHING REQUEST ACCEPTED STATE | | | |
| CM12 SWITCHING REQUEST ACCEPTED STATE | | | |
| CM13 SWITCHING REQUEST ACCEPTED STATE | | | |
| BUFFER SET MANAGEMENT TABLE TRANSFER STATE | | | |
| LOADING BUFFER SET NUMBER | | | |
| BUFFER SET 0 RECEPTION SYSTEM 0 RECEIVED STATE | | | |
| BUFFER SET 0 RECEPTION SYSTEM 1 RECEIVED STATE | | | |
| BUFFER SET 1 RECEPTION SYSTEM 0 RECEIVED STATE | | | |
| BUFFER SET 1 RECEPTION SYSTEM 1 RECEIVED STATE | | | |
| ⋮ | | | |
| BUFFER SET 7 RECEPTION SYSTEM 0 RECEIVED STATE | | | |
| BUFFER SET 7 RECEPTION SYSTEM 1 RECEIVED STATE | | | |

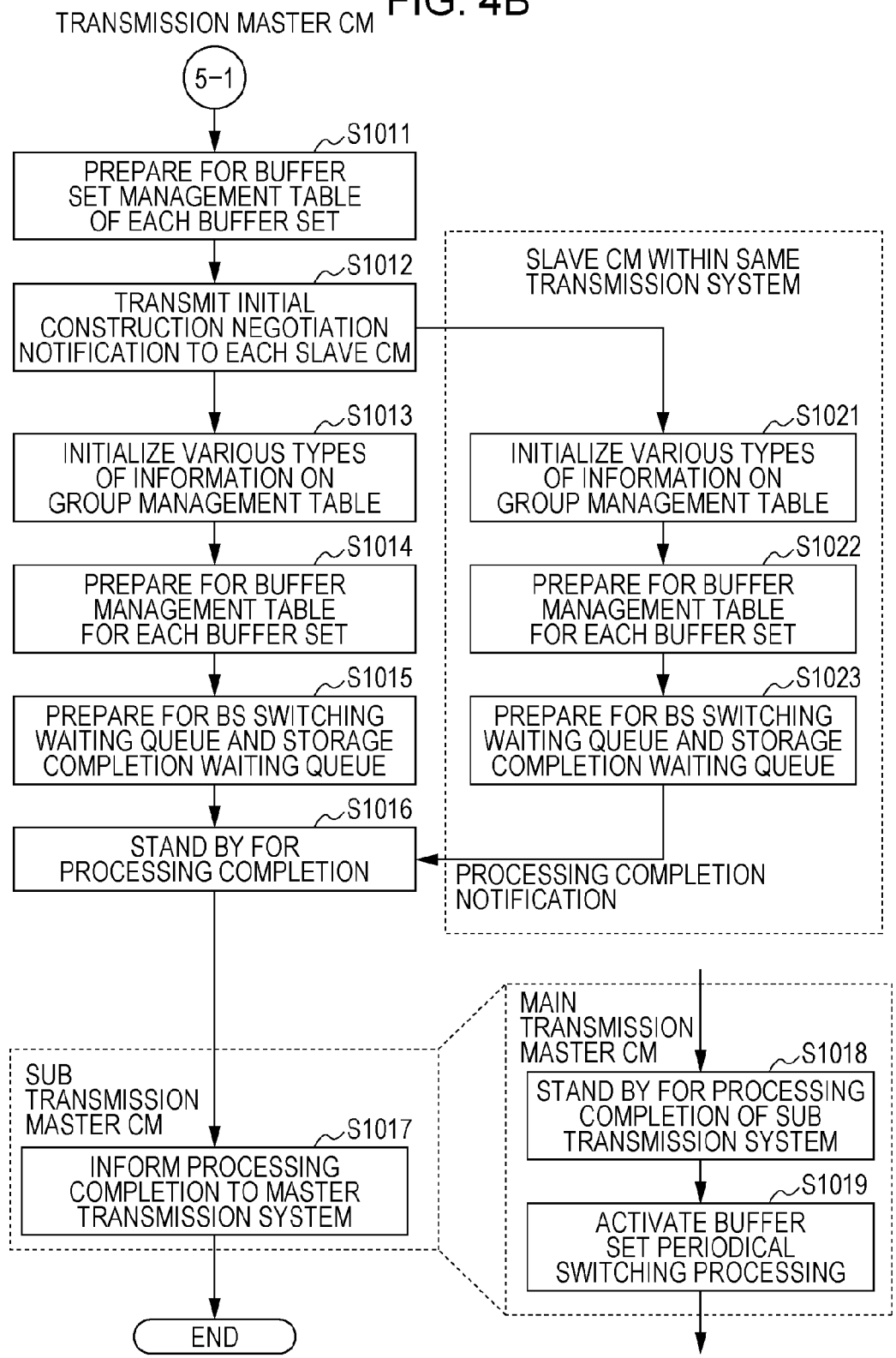

FIG. 5

| BUFFER SET NUMBER | | 0 | |
|---|---|---|---|
| BUFFER ID RECEIVED STATE | | RECEIVED | |
| LOADING WAITING STATE | | OTHER THAN WAITING | |
| TRANSMISSION BUFFER ID | RECEPTION BUFFER ID | BUFFER MANAGEMENT TABLE RECEIVED STATE | BUFFER RECEIVED STATE |
| 0x1000 | 0x1000 | UNRECEIVED | UNRECEIVED |
| 0x1100 | 0x1100 | UNRECEIVED | UNRECEIVED |

| NUMBER OF EMPTY BUFFER IDS | 4 |
|---|---|
| EMPTY RECEPTION BUFFER ID0 | 0x1006 |
| EMPTY RECEPTION BUFFER ID1 | 0x1106 |
| EMPTY RECEPTION BUFFER ID2 | 0x1007 |
| EMPTY RECEPTION BUFFER ID3 | 0x1107 |
| ⋮ | ⋮ |

FIG. 7

| BUFFER SET NUMBER | 0 |
|---|---|
| EMPTY RECEPTION BUFFER ID WAITING STATE | OTHER THAN WAITING |
| TABLE TRANSFER WAITING STATE | OTHER THAN WAITING |
| TRANSMISSION BUFFER ID | RECEPTION BUFFER ID |
| 0x1000 | 0x1000 |
| 0x1100 | 0x1100 |

FIG. 8

| BUFFER SET ID | 5 |
|---|---|
| INDEX INFORMATION POINTER | 2 |
| RECEPTION BUFFER ID | 0x1005 |
| BUFFER TRANSFER WAITING STATE | OTHER THAN WAITING |
| STORAGE STATE | STORED |
| SESSION NUMBER | 6 |
| COPY DESTINATION LUN | 1 |
| COPY DESTINATION LBA | 0x0000000000000000 |
| NUMBER OF BLOCKS | 0x10 |
| STORAGE STATE | STORED |
| SESSION NUMBER | 7 |
| COPY DESTINATION LUN | 1 |
| COPY DESTINATION LBA | 0x0000000000000000 |
| NUMBER OF BLOCKS | 0x10 |
| ⋮ | ⋮ |
| STORAGE STATE | UNSTORED |
| SESSION NUMBER | INVALID |
| COPY DESTINATION LUN | INVALID |
| COPY DESTINATION LBA | INVALID |
| NUMBER OF BLOCKS | INVALID |

Rows 5–9: INDEX INFORMATION 0
Rows 10–14: INDEX INFORMATION 1
Last 5 rows: INDEX INFORMATION 1023

| SESSION NUMBER | 0 |
|---|---|
| SESSION STATUS | Active |
| SESSION PHASE | Copying |
| COPY SOURCE LUN | 0 |
| COPY DESTINATION LUN | 1 |
| COPY SOURCE LBA | 0x0000000000000000 |
| COPY DESTINATION LBA | 0x0000000000000000 |
| NUMBER OF BLOCKS | 0x0000000000001000 |
| INITIAL COPY STATE | UNACTIVATED |

FIG. 14

| NAME OF WRITE REQUEST COPY CONTROL | Write I/O 3 |
|---|---|
| COPY SOURCE LUN | 0 |
| COPY SOURCE LBA | 0x0000000000000000 |
| NUMBER OF BLOCKS | 0x0000000000000014 |
| BUFFER SET NUMBER | 0 |
| STORAGE AREA OFFSET | 0 |
| NUMBER OF INDEX INFORMATION | 2 |
| SESSION NUMBER | 4 |

190

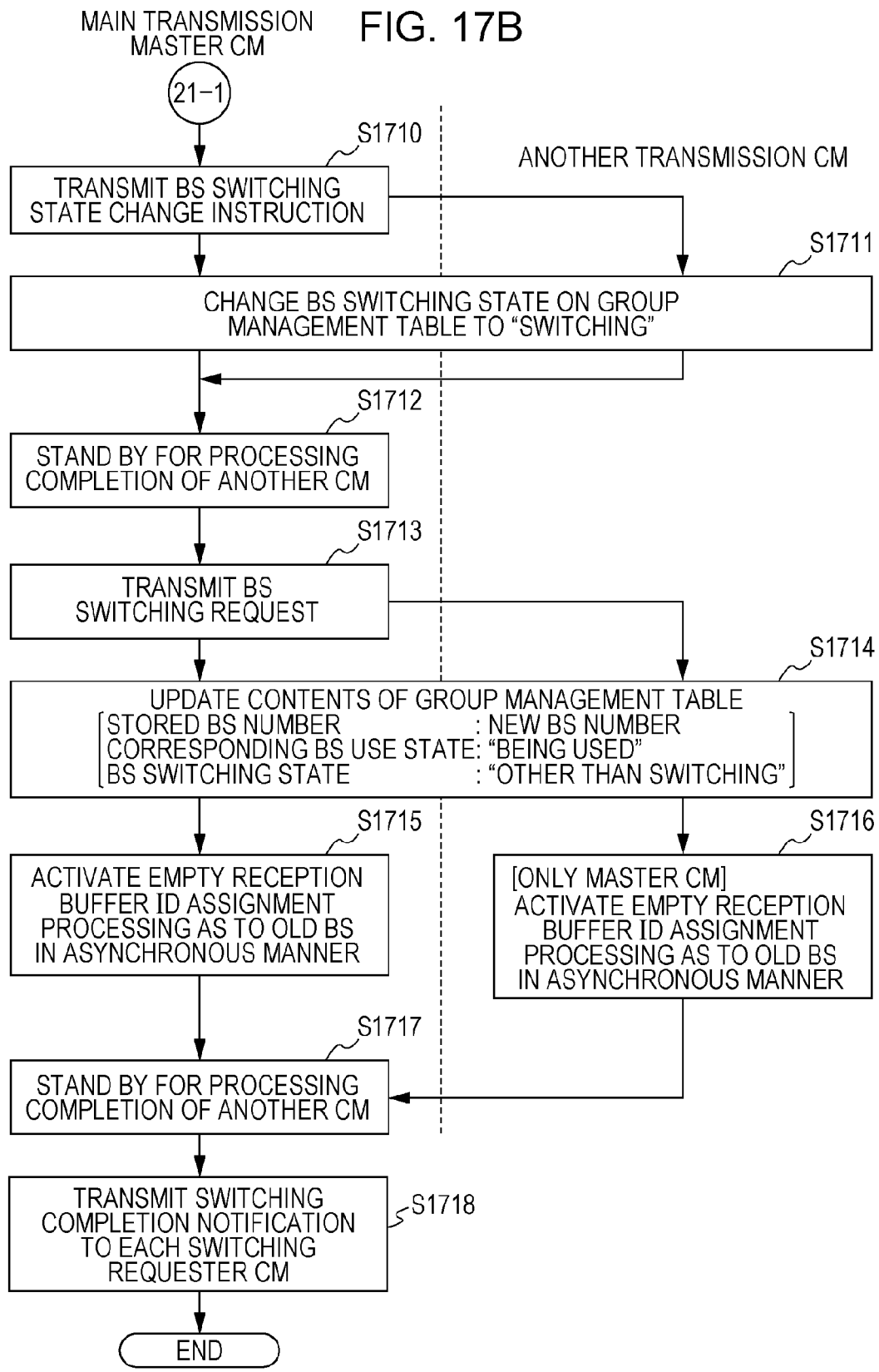

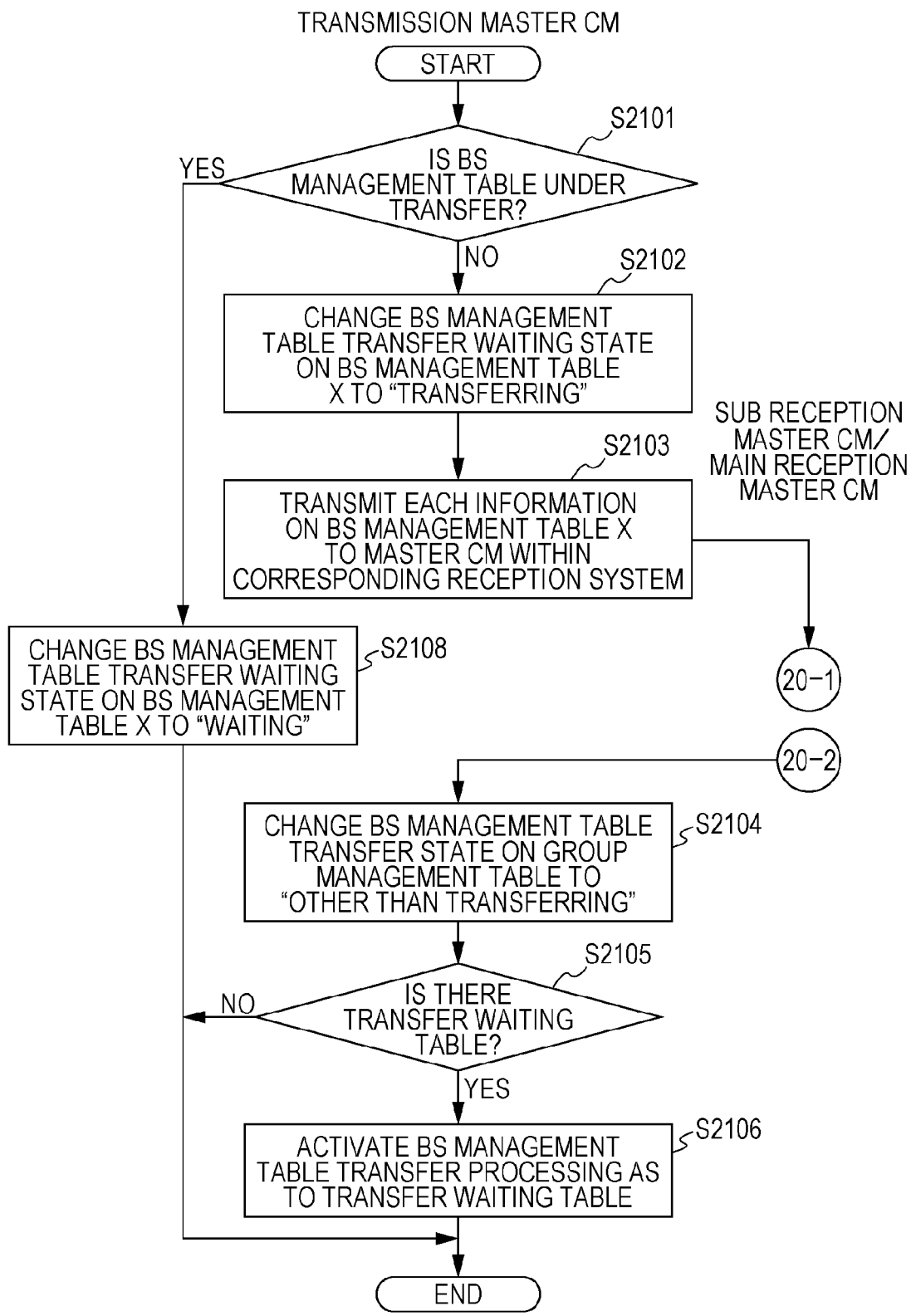

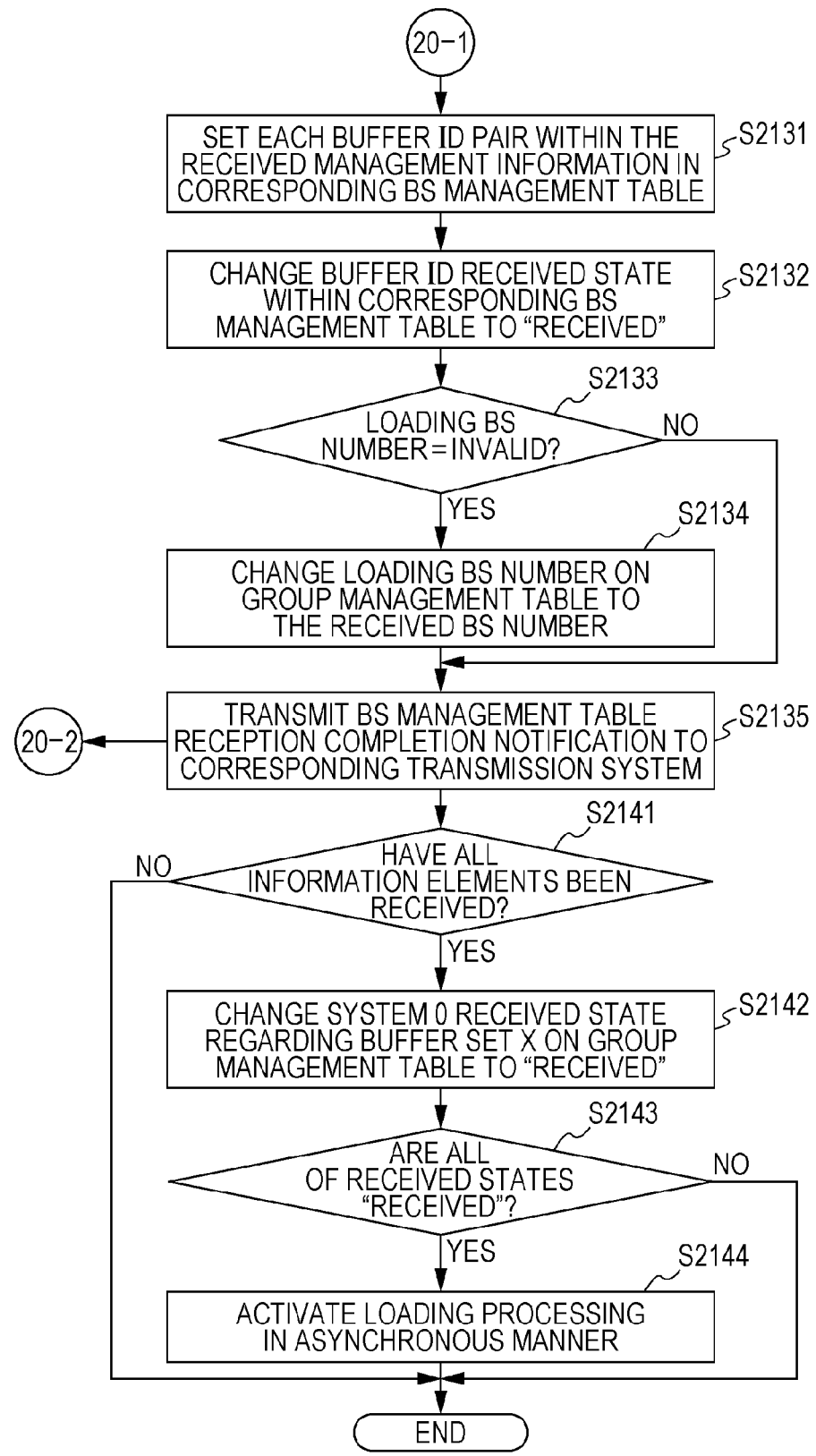

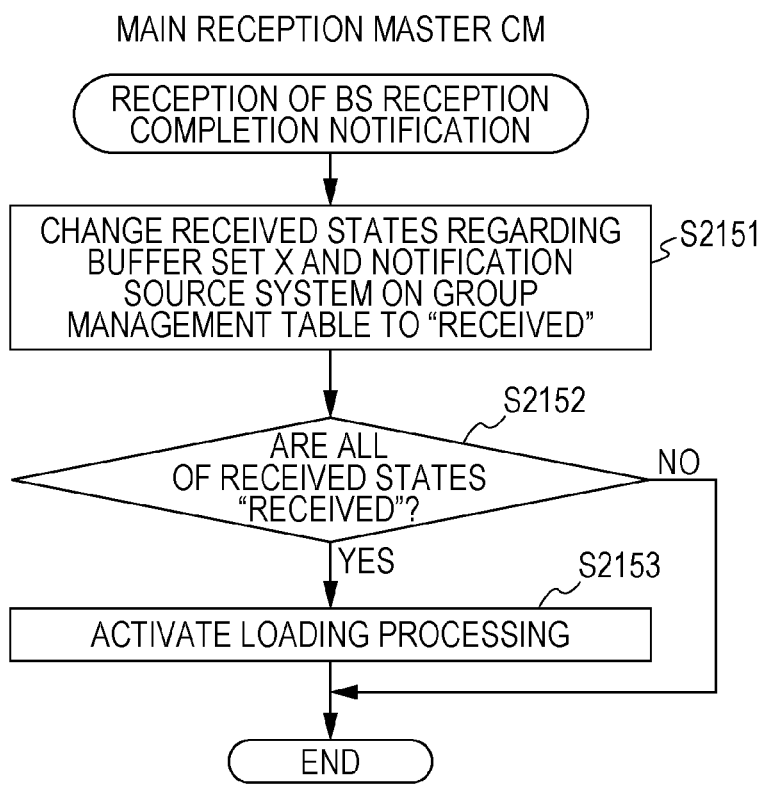

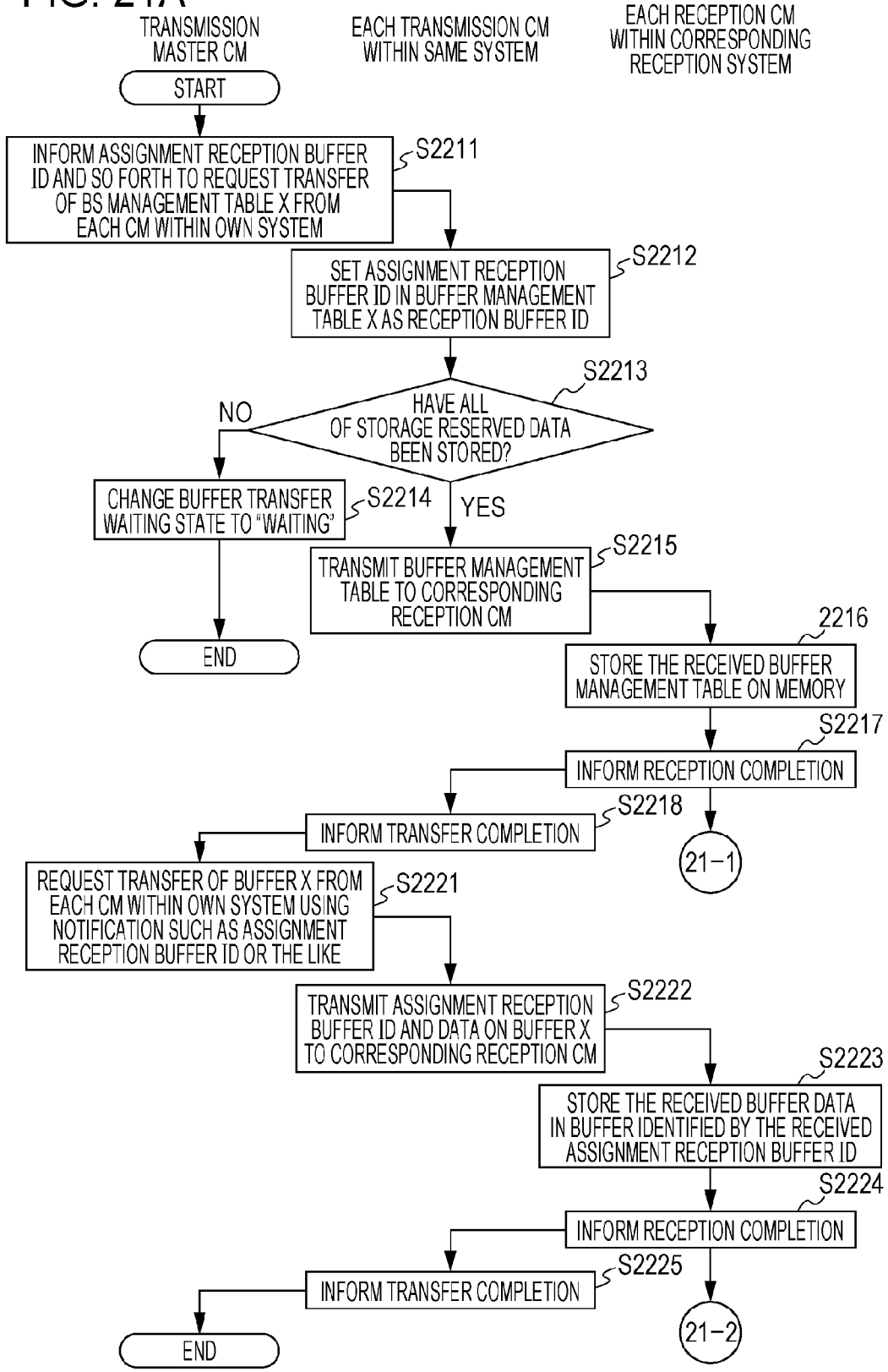

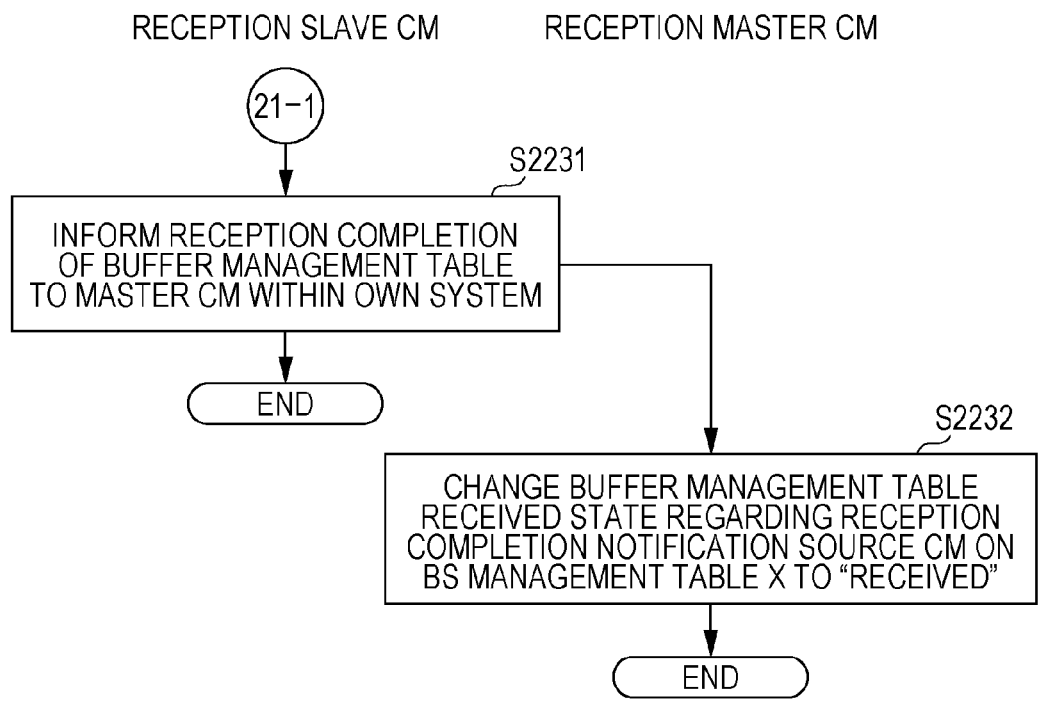
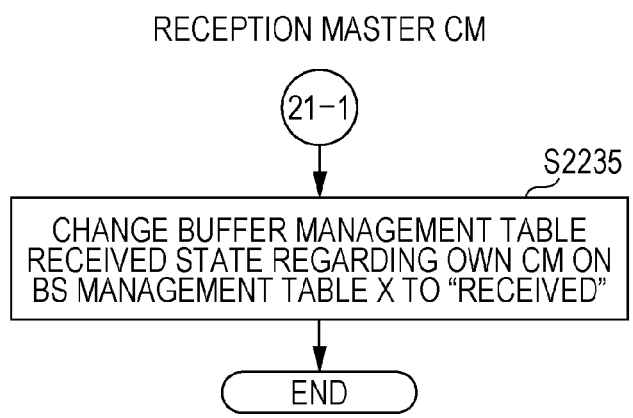

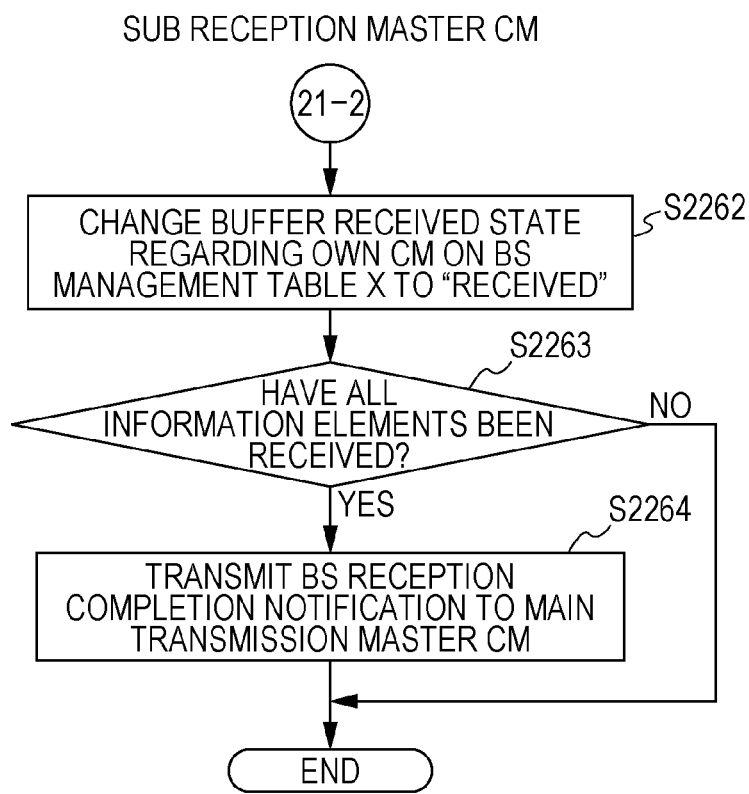

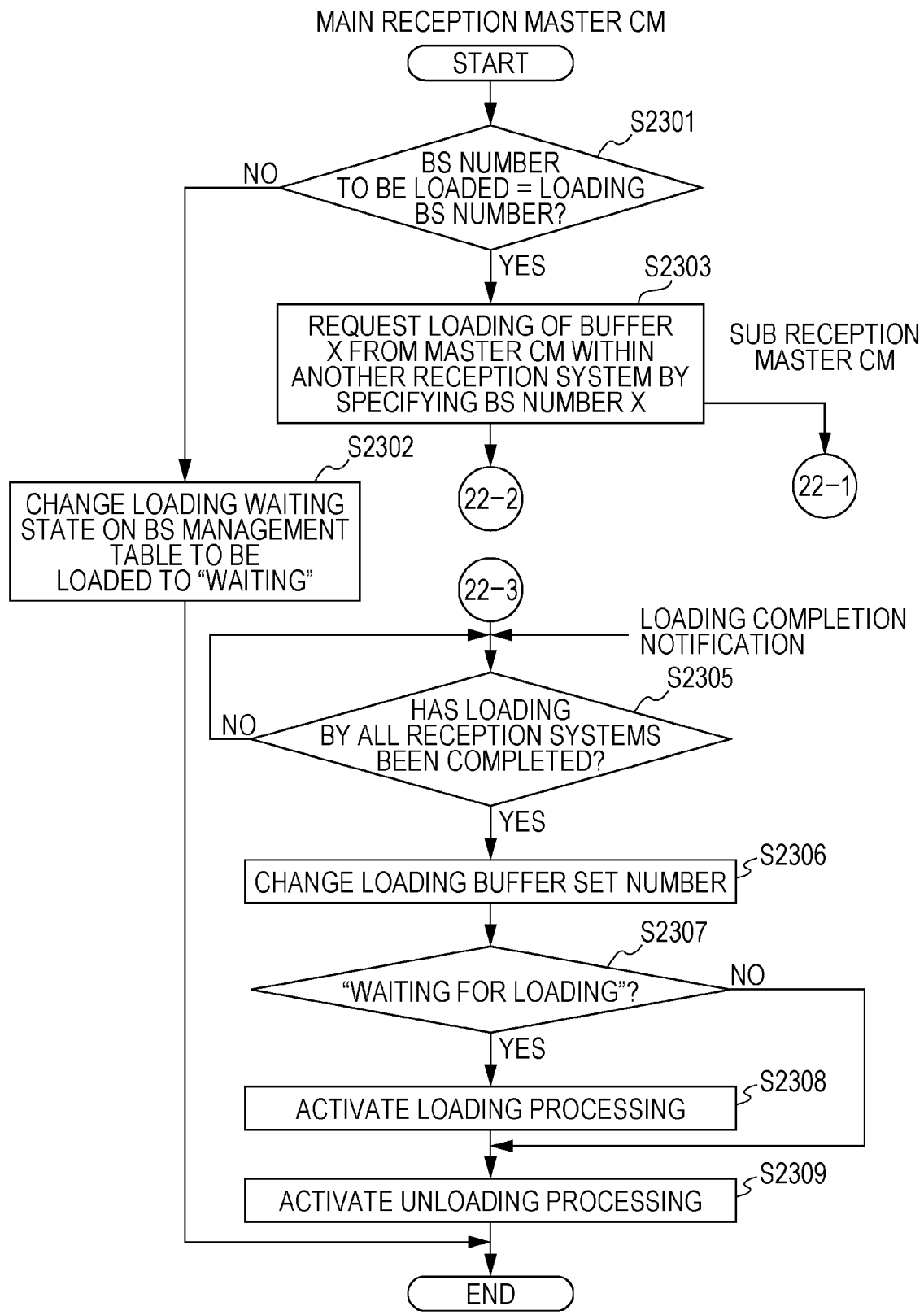

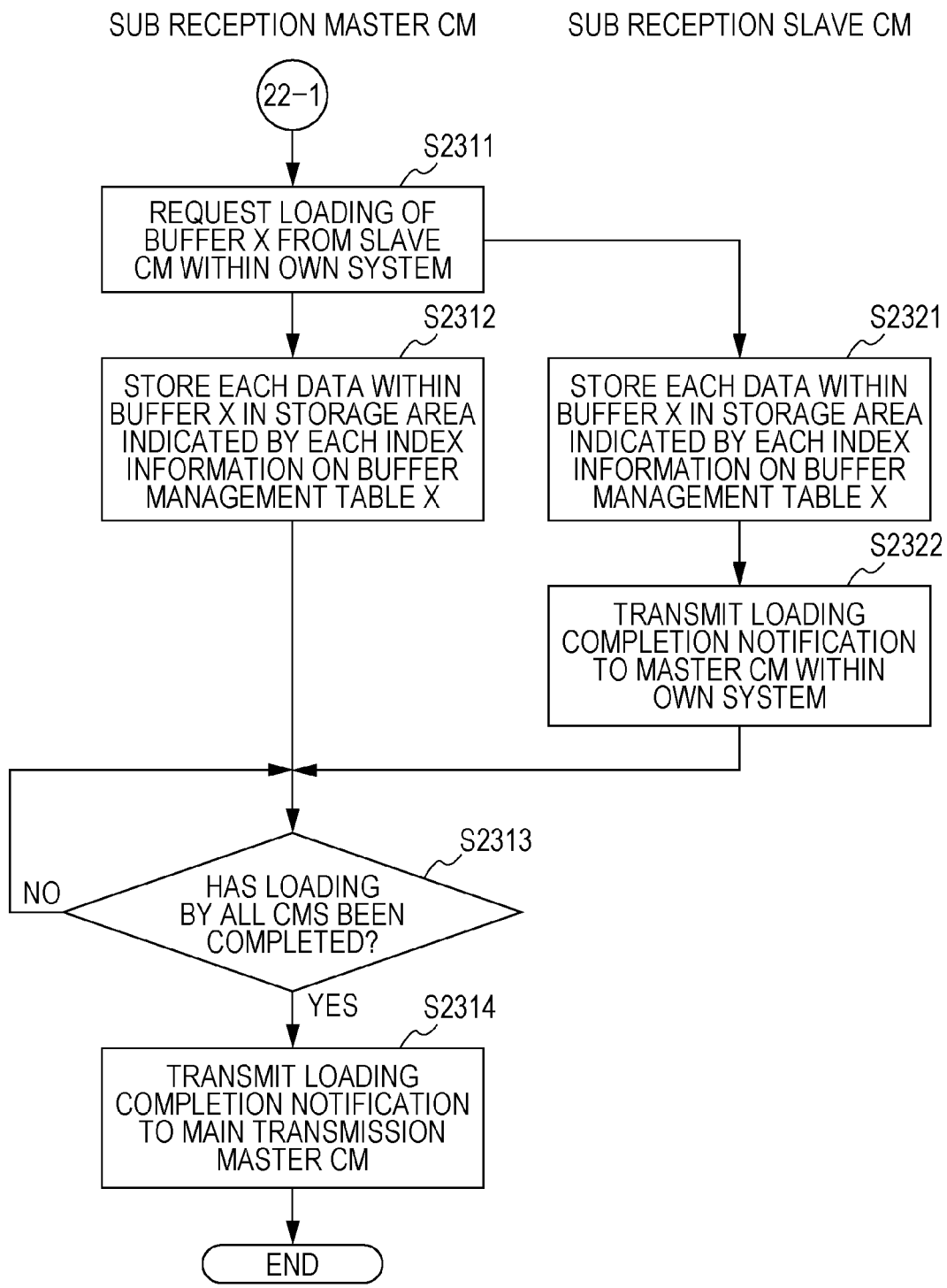

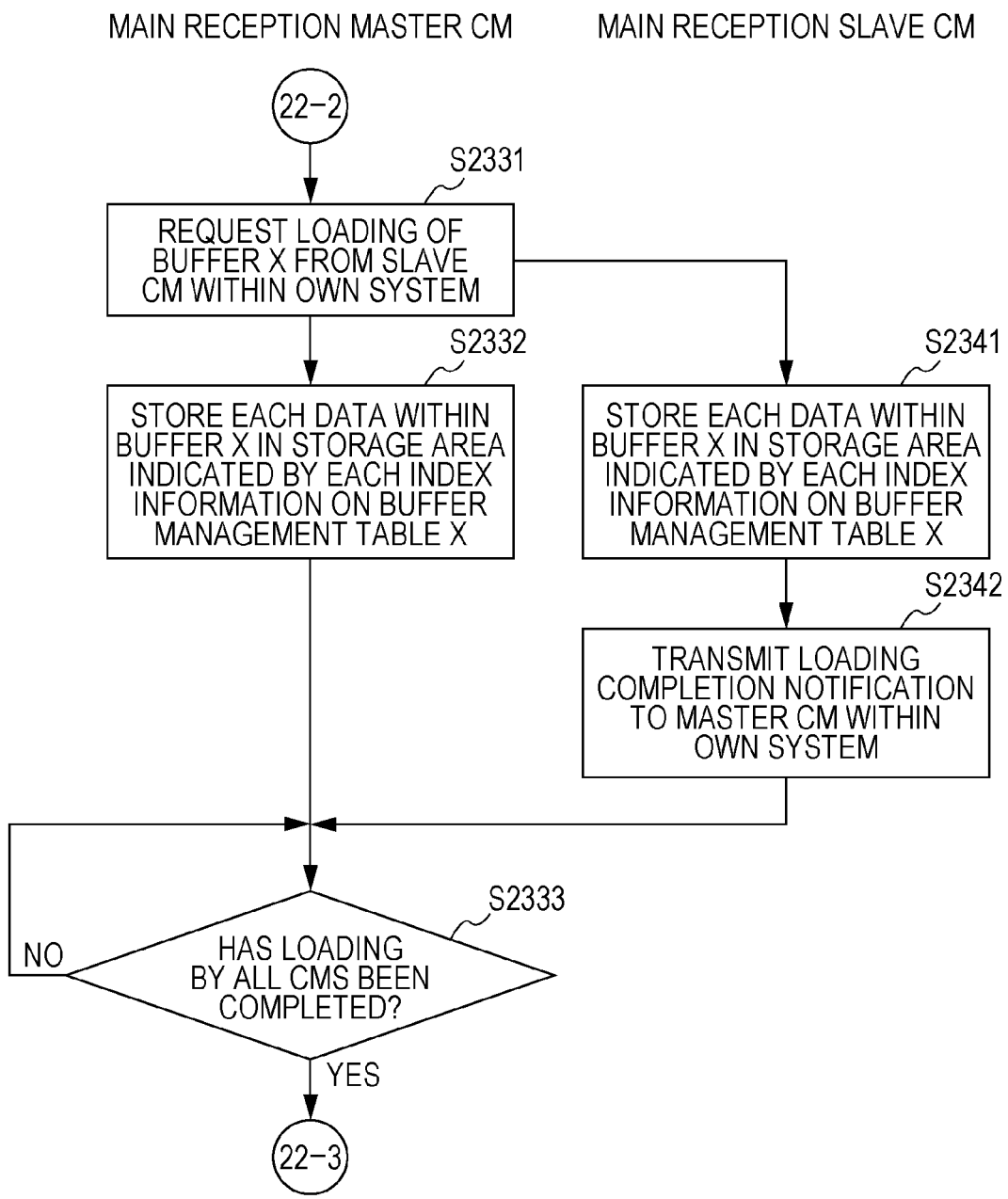

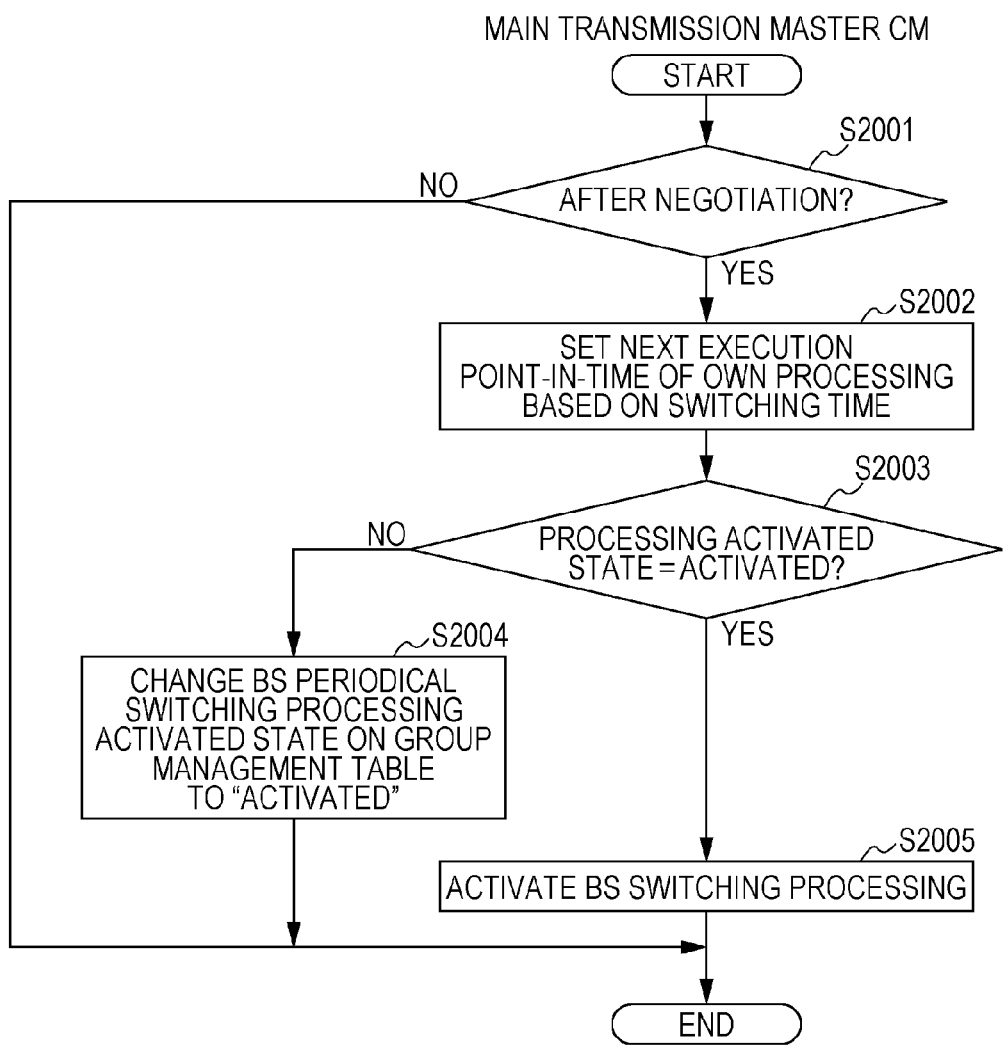

10

STORAGE SYSTEM AND STORAGE SYSTEM NETWORK

CROSS-REFERENCE TO RELATED APPLICATION

This application is based upon and claims the benefit of priority of the prior Japanese Patent Application No. 2011-220069, filed on Oct. 4, 2011, the entire contents of which are incorporated herein by reference.

FIELD

The embodiments disclosed herein are related to a storage system and a storage system network.

BACKGROUND

FIG. 1 illustrates the configuration and use mode of an existing storage system 200 having a remote copy function. Note that the storage system 200 that will be described below is a system which can increase total storage capacity by increasing the number of storage devices 220 (usually, hard disk drive) to be installed in a casing. Also, the storage system 200 is also a system wherein a particular storage device 220 is controlled by each of multiple control modules 210 installed in the casing.

As illustrated in FIG. 1, the storage system 200 is used in a state connected to a host 300 and another storage system 200 (hereafter, referred to as "copy destination system 200") installed at a remote location. Multiple sets of control data storage area 201 and updated data storage area 202 are provided within each control module 210 of the storage system 200 (hereafter, referred to as "copy source system 200") connected to the host 300. Also, multiple sets of control data storage area 201 and updated data storage area 202 are also provided within each control module 210 of the copy destination system 200. Note that the control modules 210 are units made up of a combination of a CPU (Central Processing Unit), RAM (Random Access Memory), and so forth, and the control data storage areas and updated data storage areas are both storage areas on the RAM.

Control data storage area 201 and updated data storage area 202 of one set within each control module 210 are mutually correlated as storage areas belonging to one buffer set 203. Each control module 210 within the copy source system 200 operates as follows.

In the event of having received a write request for certain updated data from the host 300, each control module 210 performs storing of write destination information, and storing of control data in control data storage area 201 belonging to a certain buffer set 203 (hereafter, referred to as "buffer set 0"), and then responds to this write request. The write destination information mentioned here is information indicating the writing position of updated data. Also, the control data mentioned here is information indicating the writing position in the copy destination system 200 of updated data.

Also, each control module 210 within the copy source system 200 performs processing for reading out updated data from the storage device 220 based on the write destination information to store the updated data in updated data storage area 202 belonging to the buffer set 0.

Further, in the event that new control data is not storable in the control data storage area 201 within any of the control modules 210, or the like, each control module 210 within the copy source system 200 switches the buffer set in a synchronous manner. Specifically, each control module 210 stores control data and updated data in a control data storage area 201 and an updated data storage area 202 belonging to a buffer set 1 respectively, for example.

Each control module 210 within the copy source system 200 sequentially transmits, after storing of updated data in the updated data storage area 202 belonging to the buffer set 0 is completed, information on each storage area belonging to the buffer set 0 to the copy destination system 200.

Each control module 210 within the copy destination system 200 temporarily internally stores the transmitted information as information regarding the buffer set 0. Each control module 210 within the copy destination system 200 performs, in the event that all of information regarding the buffer set 0 have been collected within the own system 200, writing of contents that information held by itself (a plurality of updated data and control data relating to each updated data) indicates as to the storage device 220.

Japanese Laid-open Patent Publication Nos. 2006-260292, 2010-039574, 2011-086160, 2011-086006, 2003-167683, 7-244597 and 2003-122509, and International Publication Pamphlet No. WO 2008-152691 are examples of related art.

Briefly, in the event that the above-mentioned storage system 200 (hereafter, referred to as "existing SS 200") is used in a form illustrated in FIG. 1, an environment can be realized wherein data within the copy destination system 200 is periodically backed up within the copy source system 200. Accordingly, when the existing SS 200 is used in a form such as illustrated in FIG. 1, in the event that the copy source system 200 is not usable due to a disaster or the like, operation can be resumed using the copy destination system 200.

However, in the event that shortage in storage capacity is not handleable by addition to the storage device 220, the existing SS 200 itself has to be replaced with a system having larger capacity.

Specifically, in the event of connecting another existing SS 200 to the host 300, the storage capacity on the host 300 side (storage capacity that the host 300 can use for storage of data) can be extended. Also, in the event of adding another existing SS 200 (hereafter, referred to as "second copy destination system 200") at a remote location, data within the existing SS 200 (hereafter, referred to as "second copy source system 200") added to the host 300 side can be backed up within the second copy destination system 200.

However, remote copy between the added two systems is performed completely unrelated to remote copy between the original copy source/copy destination systems 200 (hereafter, referred to as "first copy source/first copy destination systems 200"). Accordingly, with a system where the four existing SS 200 are combined, there may be a case where data within the first copy destination system 200 becomes backed up data within the first copy source system 200 at certain point-in-time T1, and data within the second copy destination system 200 becomes backed up data within the second copy source system 200 at another point-in-time T2 (e.g., point-in-time different from T1 by 30 minutes).

When backed up data within the first and second copy destination systems 200 are as mentioned above, there may be a case where operation is not resumable using the first and second copy destination systems 200 (e.g., databases are stored in the first and second copy source systems 200 in a distributed manner). Therefore, in the case of employing an existing SS 200, when storage capacity that is handleable with addition to the storage device 220 is not large enough, the system itself has to be replaced with a system having larger capacity.

SUMMARY

According to an aspect of the embodiments, a storage system to be connected to a host and another storage system for back up includes a first storage unit, a second storage unit including updated data storage areas, and a controller configured to receive a write request for updated data to the first storage unit from the host, the controller executing a process including determining, when receiving the write request for the updated data, whether or not there is a free area having capacity enough for storing the updated data in a storage area to be processed that is one of the updated data storage areas, when determining that there is the free area, storing control information into the second storage unit, the control information including first writing destination information indicating a writing area of the updated data within the first storage unit, second writing destination information indicating a writing area of the updated data within the other storage system for backup and identification information of one of the updated data storage areas used as the storage area to be processed, writing the updated data into the first storage unit, when determining that there is not the free area, changing the storage area to be processed to another one of the updated data storage areas within the second storage unit, storing the control information into the second storage unit, writing the updated data into the first storage unit, and instructing change of a storage area to be processed to another storage system to be connected to the host, reading out the updated data that is written in the first storage unit to each of the updated data storage areas of the second storage unit in accordance with the control information stored in the second storage unit in asynchronous with processing of the write request from the host, and transmitting the updated data on the updated data storage areas that is read out and the second writing destination information relating to the updated data to the other storage system for backup.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is an explanatory diagram of the configuration of a storage system network to be constructed using the configuration of a storage system according to an embodiment of the disclosed technology, and a storage system according to an embodiment.

FIG. 3 is an explanatory diagram of a group management table to be prepared on memory of each CM (Control Module) within a storage system according to an embodiment.

FIG. 4B is a flowchart (Part 2) of the initial construction negotiation processing to be executed within the storage system network according to an embodiment.

FIG. 5 is an explanatory diagram of a buffer set management table to be prepared on memory of a reception CM.

FIG. 6 is an explanatory diagram of an empty reception buffer table to be prepared on memory of a main reception master CM.

FIG. 7 is an explanatory diagram of a buffer set management table to be prepared on memory of a transmission CM.

FIG. 8 is an explanatory diagram of a buffer management table.

FIG. 9 is an explanatory diagram of an initial copy session management table.

FIG. 14 is an explanatory diagram of a write request copy control table.

FIG. 17B is a flowchart (Part 2) of the buffer set switching processing.

FIG. 20A is a flowchart (Part 1) of buffer set management table transfer processing.

FIG. 20C is a flowchart (Part 3) of the buffer set management table transfer processing.

FIG. 20D is a flowchart of processing executed at the time of receiving a buffer set reception completion notification.

FIG. 21A is a flowchart (Part 1) of buffer management table and buffer transfer processing.

FIG. 21B is a flowchart (Part 2) of the buffer management table and buffer transfer processing.

FIG. 21C is a flowchart (Part 3) of the buffer management table and buffer transfer processing.

FIG. 21F is a flowchart (Part 6) of the buffer management table and buffer transfer processing.

FIG. 22A is a flowchart (Part 1) of loading processing.

FIG. 22B is a flowchart (Part 2) of the loading processing.

FIG. 22C is a flowchart (Part 3) of the loading processing.

FIG. 24 is a flowchart buffer set periodical switching processing.

DESCRIPTION OF EMBODIMENTS

Figure 1:
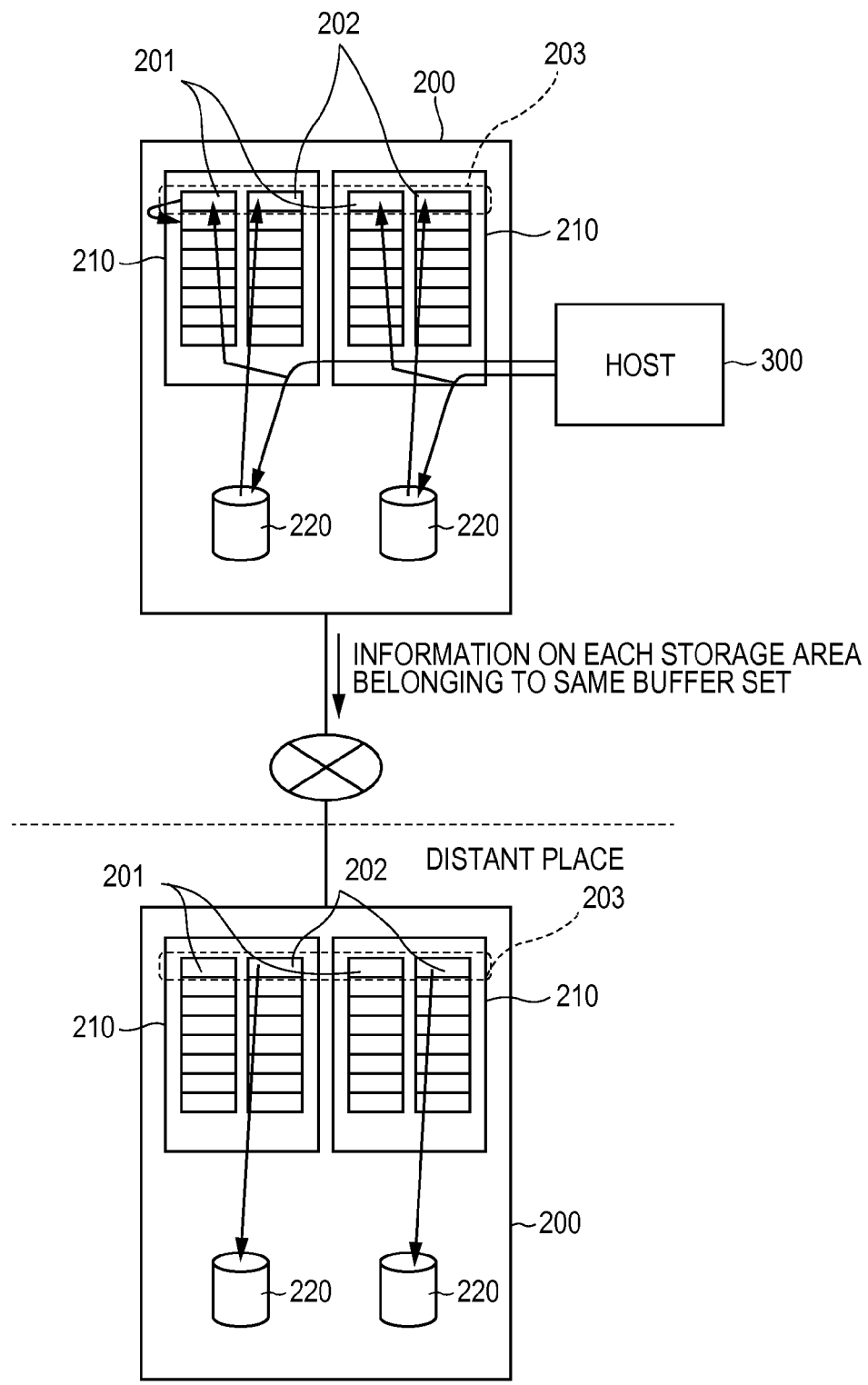
FIG. 1 is an explanatory diagram of the configuration and function of an existing storage system.

Hereinafter, an embodiment of technology disclosed in the present Specification will be described in detail with reference to the drawings.

FIG. 2 illustrates the configuration of a storage system 100 according to an embodiment of the disclosed technology, and the configuration of a storage system network to be constructed by combining multiple storage systems 100.

First, description will be made regarding overview of the storage system (hereafter, also referred to as "SS") 100 according to the present embodiment, and overview of an SS network to be constructed by combining the multiple SSs 100, with reference to this FIG. 2.

As illustrated in FIG. 2, the SSs 100 according to the present embodiment are devices (systems) including a casing 105, one or more CMs (Control Module) 110, and a storage unit 120.

With the casing 105, a first stipulated number of auxiliary storage devices (hard disk device, SSD (Solid State Device), etc.) 125 having various specifications (storage capacity, response speed, etc.), and a second stipulated number of CMs 110, can be installed.

The storage unit 120 is a unit realized by the multiple auxiliary storage devices 125 installed in the casing 105. At the time of setup of the SS 100, a setup task for classifying the multiple auxiliary storage devices 125 (i.e., storage units 120) installed in the casing 105 into several RAID (Redundant Array of Independent Disks) groups is performed by the user. Also, a setup task for classifying the RAID groups into several logical units, and a task for setting (specifying) a CM 110 responsible for control of the RAID groups are also performed.

The CMs 110 are basically units for performing processing (read/write access) of contents specified by a read/write request from the host 300 as to the storage unit 120. Note that the read/write request that the CMs 110 within the SSs 100 receive from the host 300 is a request for specifying a storage area within the storage unit 120 to be read/written using a LUN (Logical Unit Number), a LBA (Logical Block Address), and the number of blocks. Also, the host 300 transmits a read/write request as to a certain logical unit to the CM 110 responsible for control of the logical unit thereof.

As illustrated in FIG. 2, the CMs 110 include a CA (Channel Adapter) 113 which is an interface module as to the host 300, and two FCs (Fiber Channels) 115 which are interface modules as to the storage unit 120. Also, the CMs 110 also include a RA (Remote Adapter) 114 which is an interface module as to another SS 100, and a LAN port (not illustrated) for connecting the own CM 110 to a LAN (Local Area Network). Further, the CMs 110 include ROM (Read Only Memory; not illustrated), a CPU (Central Processing Unit) 111 which performs various types of processing in accordance with a program (firmware) stored in this ROM, and memory 112 used for temporary storage of various types of data.

A SS network constructed with multiple SSs 100 is a system wherein N (≥2) SSs 100 (hereafter, referred to as "transmission systems 100") and N SSs 100 installed at a remote location (hereafter, referred to as "reception systems 100") are connected to the host 300 via a network.

Though details will be described later, this SS network is a system wherein the N transmission systems 100 on the host 300 side serve as one storage system, and copy with sequentiality of writing data by the host 300 is performed on the N reception systems 100 on the remote location side.

The SSs 100 according to the present embodiment are devices whereby an SS network having the above-mentioned function can be constructed in a form unneeded for exchange of existing transmission/reception systems or the like by adding a transmission system 100 and a reception system 100 to a system including some transmission systems and some reception systems.

The configurations and operations of the SSs 100 according to the present embodiment will further be described with a central focus on a case where the SSs 100 are used as the components of an SS network.

The SS network is usually constructed by adding some SSs 100 (reception systems 100, transmission systems 100) to a system in operation including some SSs 100. Accordingly, at the time of normal construction of an SS network, a setup task for the added some SSs 100 (setup task such as RAID grouping or the like) is performed by a user.

A configuration setup task and a copy range setup task are then performed by the user.

First, the contents of the configuration setup task, and the functions of the CMs 110 relating to this task will be described.

The CMs 110 for the SS 100 have a web server function for providing various web pages for configuration setup. Therefore, the configuration setup task is performed by connecting a computer to a CM 110 within a certain reception system via a LAN (usually, via a hub connected to the LAN port of each CM 110 within a reception system), and activating a web browser of this computer.

Note that, at the time of initial activation or the like of a certain SS 100, a CM-ID which is identification information within the SS 100 thereof (numeric information with the present embodiment) is provided to each CM 110 within the SS 100 thereof. A CM 110 to which the smallest CM-ID has been provided within the SS 100 serves as a CM 110 having the above-mentioned web server function (and other various functions) (hereafter, referred to as "master CM"). Also, the other CMs 110 serve as CMs 110 having no web server function mentioned above (hereafter, referred to as "slave CM"). Accordingly, a device which actually receives information set by the user is a master CM (CM 110 serving as the master CM).

Though detailed description (such as configuration description of each web page for configuration setup) will be omitted, identification information for each SS 100 serving as components (transmission system 100 or reception system 100) of the SS network is set by the user at the time of the configuration setup task. Also, one transmission system 100 to be operated as the main transmission system 100, and one or more transmission systems 100 to be operated as sub transmission systems 100 are also set. One reception system 100 to be operated as the main reception system 100, and one or more reception systems 100 to be operated as sub reception systems 100 are also set.

Also, correspondence relationship between the transmission system 100 and the reception system 100 is also set. The setup of this correspondence relationship is performed by assigning a group ID to each of the reception/transmission systems 100, and then correlating a group ID assigned to a certain transmission system 100 with a group ID assigned to the reception system 100 to be correlated with this transmission system 100.

Further, a total buffer size on the transmission side, a total buffer size on the reception side, and buffer set automatic switching time (details of each information will be described later) are also set by the user.

After the configuration setup task as described above, setup contents are informed from the master CM which has actually accepted setup to the slaves CM within the own system 100, and the CMs 110 within other systems 100 (transmission/reception system 100). The setup contents by the user, information for managing the situation of each buffer set, and a group management table for holding information for managing the execution situations of various types of processing are prepared at the own memory 112 by the CMs 110 within the SS network.

The operation of each CM 110 within each SS 100 making up the SS network differs depending on the type of the won system, and whether the own CM is a master CM or slave CM. Therefore, for convenience of description, hereinafter, the master CM within some system 100 (some=main transmission, sub transmission, transmission, etc.) shall be referred to as some master CM (=main transmission master CM, sub reception master CM, transmission master CM, etc.). Similarly, a slave CM and CM 110 (master CM or slave CM) within some system 100 shall be referred to as some slave CM (main transmission slave CM, etc.) and some CM (transmission CM, etc.).

FIG. 3 illustrates an example of a group management table 150 that the main transmission master CM prepares on the own memory 112 at the time of the configuration setup task.

Note that, the main transmission master CM prepares the group management table 150 illustrated in FIG. 3 on the memory 112, in the event that the following setup is performed by the user, and also in the event that a total number of the CMs 110 within two transmission systems 100 specified by the user is four.

Number of transmission systems: 2
Number of reception systems: 2
Identification information of SS 100 serving as main transmission system (transmission system 0): "A"
Identification information of SS 100 serving as sub transmission system (transmission system 1): "B"
Identification information of SS 100 serving as main reception system (reception system 0): "C"
Identification information of SS 100 serving as sub reception system (reception system 1): "D"
Group ID of main transmission system: "0"
Group ID of sub transmission system: "2"
Group ID of main reception system: "0"
Group ID of sub reception system: "1"
Main transmission system is correlated with main reception system (transmission system of which the group ID is "0" is correlated with reception system of which the group ID is "0")
Sub transmission system is correlated with sub reception system (transmission system of which the group ID is "2" is correlated with reception system of which the group ID is "1")
Transmission-side total buffer size (MB): 64
Reception-side total buffer size (MB): 64
Buffer set automatic switching time (sec): 60

The buffer size set (stored) in this group management table 150 is a value determined beforehand as size (size in increments of MB (mega binary byte)) of one buffer (details will be described later) to be prepared on the memory 112 of each CM 110. The buffer management table size is also a value determined beforehand as size (size in increments of KB (kilo binary byte)) of one buffer management table (FIG. 8: details will be described later).

The number of buffer sets set in the group management table 150 is information that regulates the number of buffer sets prepared within each transmission system 100. A calculation result Ns of "transmission-side total buffer size/buffer size" is set in the group management table 150 as the number of buffer sets.

Note that the buffer sets mentioned here are sets made up of one set of buffer set management table, buffer management table, and buffer on the memory 112 within the master CM of a certain transmission system 100, and one set of a buffer management table and a buffer on the memory 112 within each slave CM of the same transmission system. Though details of each component of a buffer set will be described later, there is also a buffer set (reception-side buffer set) to be prepared within a reception system. Therefore, in the event that there may be likely to cause misunderstanding, a buffer set to be prepared within each transmission system will be referred to as "transmission-side buffer set".

Other information that can be set in the group management table 150 includes information indicating the setup contents by the user (group ID, identification information of transmission system 0 (=main transmission system), group ID correspondence relation information, etc.), and the following information.

buffer set automatic switching time, buffer set periodical switching processing activated state, negotiation state, storage buffer set number, buffer set switching state, buffer set switching request state, Ns buffer set use states ("buffer set j use state"; j=0 through Ns−1), buffer set empty waiting state, switching accepted state regarding each transmission CM within all of transmission systems ("CM 10 switching accepted state", etc.), loading buffer set number, received state by reception system of each buffer set ("buffer set j reception system k received state"; j=0 through Ns−1, k=0 through number of reception systems−1)

In other words, the group management table 150 is a table having a different actual configuration (number of actually storable information) depending on Ns, the number of reception systems 100, and so forth.

Therefore, the main transmission master CM determines, at the time of the configuration setup task being performed, the actual configuration of the group management table 150 to be prepared on the memory 112 based on the setup contents by the user, Ns calculated from the transmission-side total buffer size and buffer size, and so forth.

The main transmission master CM prepares (generates) a group management table 150 (FIG. 3) having the determined configuration wherein the setup contents by the user are recorded, and 8, 12, Ns, and "before negotiation" are set as the buffer size, buffer management table size, the number of buffer sets, and negotiation state respectively, on the memory 112.

The group management table 150 to be prepared on the memory 112 of other CMs 110 also has the same configuration as the group management table 150 illustrated in FIG. 3. However, the negotiation state is information used by the transmission master CMs (main transmission master CM and sub transmission master CM) alone. Also, the buffer set automatic switching time and buffer set automatic switching processing activated state are information used by the main transmission master CM alone.

Therefore, the sub transmission master CM prepares a group management table 150 where no significant information is set as the negotiation state, on the memory 112. Also, the transmission slave CMs and the reception CMs prepare (generate) a group management table 150 where no significant information is set as the negotiation state, buffer set automatic switching time, and buffer set automatic switching processing activated state, on the memory 112.

Next, the operation of each CM 110 after generation completion of the group management table 150 will be described. Note that a buffer set will be referred to as BS in the following description.

Figure 4A:
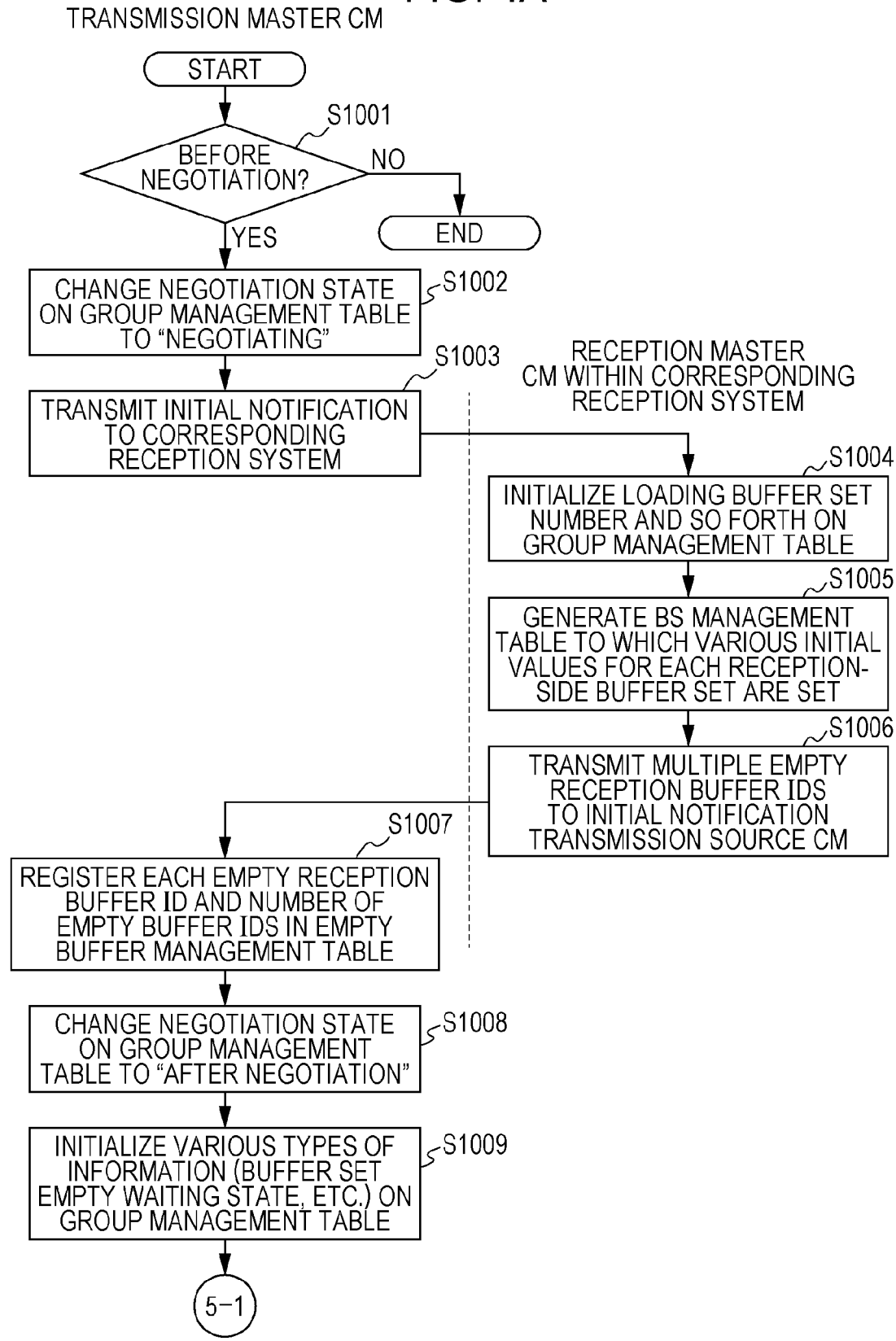
FIG. 4A is a flowchart (Part 1) of initial construction negotiation processing to be executed within a storage system network according to an embodiment.

Upon generation of the group management table 150 being completed on the memory 112, the transmission master CMs (master CMs within the transmission systems 100) become a state in which initial construction negotiation processing of a procedure illustrated in FIGS. 4A and 4B is periodically executed. Note that this initial construction negotiation processing is not executed by the transmission master CMs alone but executed by the master CM and slaves CM within a certain transmission system, and the master CM within the reception system corresponding to this transmission system. Also, each table that each CM 110 references/updates during this initial construction negotiation processing and later-described each process is a table on the own memory 112.

As illustrated in FIG. 4A, the transmission master CM which has started the initial construction negotiation processing first determines whether or not the negotiation state on the group management table 150 (FIG. 3) is "before negotiation" (operation S1001). In the case that the negotiation state is not "before negotiation" (operation S1001; NO), the transmission master CM ends this initial construction negotiation processing without performing anything.

On the other hand, in the case that the negotiation state is "before negotiation" (operation S1001; YES), the transmission master CM changes the negotiation state on the group management table 150 to "negotiating" (operation S1002). Next, the transmission master CM transmits an initial notification having predetermined contents to the corresponding reception system 100 (reception system 100 correlated with the own transmission system 100) (operation S1003).

This initial notification is processed by the master CM (reception master CM) within the corresponding reception system 100. The reception master CM which has received the initial notification initializes the loading BS number on the group management table 150 to "invalid" (operation S1004). Also, in this operation S1004, the reception master CM also performs processing for initializing the received state by reception system regarding each BS on the group management table 150 ("buffer set 0 reception system 0 received state" and so forth) to "unreceived".

Thereafter, the reception master CM generates a BS management table for each reception-side buffer set n (n=0 through Ns−1; Ns is the number of BSs) wherein an initial value is set as various types of information, on the own memory 112 (operation S1005).

The reception-side buffer set n mentioned here is a reception-side buffer set to be identified by a buffer set number that is n. Also, a reception-side buffer set mentioned here is a set made up of one set of a BS management table, a buffer management table, and a buffer on the memory 112 of the master CM within a certain reception system, and one set of a buffer management table and a buffer on the memory 112 of each slave CM within the same reception system. Ns reception-side buffer sets are prepared within the reception system in a form appended with a BS number of 0 through Ns−1. Note that the number called as Ns is a number in the event that some not assigned with a buffer are also counted as reception-side buffer sets.

Hereafter, the BS management table for reception-side buffer set, and the BS management table for reception-side buffer set n will be referred to as reception-side BS management table, and reception-side BS management table n, respectively.

FIG. 5 illustrates an example of the reception-side BS management table. As can be apparent from this FIG. 5, the reception-side BS management table is a table wherein multiple sets of transmission buffer ID, reception buffer ID, buffer management table received state, and buffer received state can be stored along with a BS number, a buffer ID received state, and a loading waiting state.

In operation S1005, the reception master CM prepares for each reception-side BS management table n (n=0 through "Ns−1") on the memory 112 wherein the following information is set.

Buffer set number: n
Buffer ID state: "unreceived"
Loading waiting state: "other than waiting"
Each transmission buffer ID: "invalid"
Each reception buffer ID: "invalid"
Each buffer management table received state: "unreceived"
Each buffer received state: "unreceived"

The reception master CM which has finished the processing in operation S1005 first, in the subsequent operation S1006, calculates a number Nr of buffers to be prepared on the memory 112 of each CM 110 within the own system from the reception-side total buffer size and buffer size on the group management table 150. More specifically, the reception master CM calculates "reception-side total buffer size/8" (8 is a buffer size), thereby calculating the number Nr of buffers to be prepared on the memory 112 of each MC 110 within the own system 100.

Next, the reception master CM generates buffer IDs regarding Nr buffers to be prepared on the own memory 112, and Nr buffers to be prepared on the memory 112 of each slave CM.

In the event that each CM 110 prepares for Y buffers on the memory 112, a storage area on the memory 112 to be used as each buffer is determined to be a 8-MB consecutive storage area with "existing address+b·8 MB" (b=an integer value of 0 through Y−1) being taken as the head address. Also, the buffer ID of a buffer with "existing address+b·8 MB" being taken as the head address on the memory 112 of a certain CM 110 is determined to be information in which the CM-ID (one byte data in the present embodiment) of this CM 110 is followed by one byte data representing b.

Accordingly, the reception master CM generates Nr pieces of data in which the own CM-ID is followed by one byte data indicating 0 through Nr−1 as the buffer IDs of the Nr buffers to be prepared on the own memory 112. Also, the reception master CM generates Nr pieces of data in which one byte data indicating 0 through Nr−1 is continued, as to the CM-ID of each slave CM as the buffer IDs of the Nr buffers to be prepared on the memory 112 of each slave CM, respectively.

In this way, the reception master CM which has generated the number of installed CMs of the own system 100×Nr buffer IDs transmits the generated buffer IDs to the initial notification transmission source CM as empty reception buffer IDs. The reception master CM then ends the processing in operation S1006 and the processing started in response to reception of the initial notification.

On the other hand, the transmission master CM which has received the multiple empty reception buffer IDs prepares for an empty reception buffer management table 160 on the own memory 112, and registers the received empty reception buffer IDs and the total number of the received empty reception buffer IDs in the prepared empty buffer management table 160 (operation S1007). Note that the reception buffer management table 160 that the transmission master CM prepares on the memory 112 is, as illustrated in FIG. 6, a table wherein only a total number of empty reception buffer IDs (the number of empty reception buffer IDs), and multiple empty reception buffer IDs can be stored.

The transmission master CM which has finished the processing in operation S1007 (FIG. 4A) changes the negotiation state on the group management table 150 to "after negotiation" (operation S1008). Further, the transmission master CM initializes the buffer set empty waiting state, BS management table transfer state, and BS periodical switching processing activated state on the group management table 150 to "other than waiting", "other than transferring", and "unactivated", respectively (operation S1009).

Thereafter, in operation S1011 (FIG. 4B), the transmission master CM prepares for a BS management table for each transmission-side buffer set n (n=0 through Ns−1; Ns is the number of buffer sets) to which various initial values are set, on the memory 112.

Hereafter, the BS (buffer set) management table for the transmission-side buffer set, and the BS management table for the transmission-side buffer set n will also be referred to as transmission-side BS management table and transmission-side BS management table n, respectively.

FIG. 7 illustrates an example of the transmission-side BS management table. As can be apparent from this FIG. 7, the transmission-side BS management table is a table wherein multiple sets of transmission buffer ID and reception buffer ID can be stored along with the BS number, empty reception buffer ID waiting state, and table transfer waiting state.

The reception master CM performs processing for preparing for each reception-side BS management table n (n=0 through "Nr−1") on the memory 112 wherein the following information is set in operation S1011.

Buffer set number: n
Empty reception buffer ID waiting state: "unreceived"
Table transfer waiting state: "other than waiting"
Each transmission buffer ID: "invalid"
Each reception buffer ID: "invalid"

The transmission master CM which has finished the processing in operation S1011 transmits an initial construction negotiation notification having predetermined contents to each slave CM within the own system 100 (operation S1012).

Thereafter, the transmission master CM initializes various types of information on the group management table 150 (operation S1013). Specifically, the transmission master CM initializes the storage BS number, BS switching state, and each switching request accepted state ("CM 10 switching request accepted state" etc.) on the group management table 150 (FIGS. 3) to "0", "other than switching", and "other than requesting", respectively. Further, the transmission master CM initializes the buffer set 0 use state to "being used", and initializes other buffer set use states to "other than using".

In the subsequent operation S1014, the transmission master CM performs processing for preparing a buffer management table for each transmission-side buffer set n (n=1 through Ns−1) to which various initial values are set, on the own memory 112.

The buffer management table is, as illustrated in FIG. 8, a table wherein 1024 pieces of index information including the storage state, session number, copy destination LUN, copy destination LBA, and the number of blocks can stored along with the buffer set number, index information pointer, and so forth.

The storage state within index information m (m=0 through 1023) on this buffer management table is information indicating whether or not storage of data to the m-th unit storage area of a buffer has been completed. The m-th unit storage area of a buffer mentioned here is a storage area (storage area of 8 KB (=8 MB/1024)) obtained by dividing a buffer (storage area used as a buffer) by 1024. Also, the m-th unit storage area of a buffer mentioned here is the m-th unit storage area counted from the head side of the buffer (the unit storage area of the buffer head is the 0-th unit storage area). Note that, as already described above, a storage area on the memory 112 that the CM 110 uses as Y buffers is a 8-MB consecutive storage area with "existing address+b·8 MB" (b=an integer value of 0 through Y−1) being taken as the head address. Accordingly, though a buffer to be prepared on the memory 112 of the transmission CM is also such a buffer, the transmission CM uses a 8-MB consecutive storage area with "existing address+·8 MB" (b=an integer value of 0 through Ns−1) being taken as the head address, as the buffer of a buffer set b.

The copy destination LUN, copy destination LBA, and the number of blocks within the index information m are information indicating a storage area of the storage unit 120 within the reception system 100 in which data stored in the m-th unit storage area/data to be stored thereafter has to be written. The session information within the index information is identification information appended to a series of processes which the own index information relates to.

The buffer set number on the buffer management table is a BS number on the transmission side BS to which the own table belongs. The index information pointer is a value to be updated such that the total number of index information, and session number, and so forth which are actually set on the buffer management table indicate the smallest index information number (m in the index information m) that has not been set. The buffer transfer waiting state is information to be changed to "waiting" in the event that setting of the index information as to the own buffer management table has been completed, and completion of data storage as to the corresponding buffer is waiting for.

The reception buffer ID on the buffer management table is the buffer ID of a transfer destination buffer of data on a buffer included in the same transmission-side buffer set. This reception buffer ID is information to be set in the buffer management table to inform this transfer destination buffer to the reception CM (details will be described later).

The processing in operation S1014 is processing for preparing the following on the memory 112 as the BS management table for each reception-side buffer set n (n=0 through "Nr−1").

Buffer set number: n
Index information pointer: 0
Reception buffer ID: "invalid"
Buffer transfer waiting state: "other than waiting"
Each storage state: "unstored"
Each session number: "invalid"
Each copy destination LUN: "invalid"
Each copy destination LBA: "invalid"
Each block number: "invalid"

The transmission master CM which has finished the processing in operation S1014 prepares for an empty BS switching waiting queue and a storage completion waiting queue on the own memory 112 (operation S1015).

Also, the transmission slave CM which has received the initial construction negotiation notification also first initializes various types of information on the group management table 150 in the same way as with the transmission master CM (operation S1021). However, the use state of each BS is information that the transmission master CM alone uses. Therefore, in operation S1021, the transmission slave CM performs only processing for initializing the storage BS number, BS switching state, and each switching request state on the group management table 150 to "0", "other than switching", and "other than requesting", respectively.

Thereafter, in operations S1022 and S1023, the transmission slave CM performs the same processes as with operations S1014 and S1015, respectively.

In the case that the processing in operation S1023 has been completed, the transmission slave CM informs completion of the processing to the transmission master CM (master CM within the own system 100).

On the other hand, the transmission master CM which has finished the processing in operation S1015 stands by for the processing by each slave CM being completed (operation S1016).

The transmission master CM which has recognized completion of the processing by each slave CM informs, when the own CM is a sub transmission master CM, completion of the processing to the main transmission master CM (operation S1017). The sub transmission master CM then ends this initial construction negotiation processing.

Also, the transmission master CM which has recognized completion of the processing by each slave CM stands by for completion of the processing from each sub transmission system 100 being informed when the own CM is the main transmission master CM (operation S1018). When confirming that the processing by each sub transmission system 100 has been completed, the main transmission master CM activates the BS periodical switching processing (details will be described later) (operation S1019), and then ends the initial construction negotiation processing.

Next, the contents of the copy range setup task, and the function of the CM 110 relating to this task will be described.

First, description will be made regarding an initial copy session management table 180 to be generated on the memory 112 of each transmission CM as results of the copy range setup task.

FIG. 9 illustrates an example of the initial copy session management table 180. The copy source LUN, copy source LBA, and the number of blocks on this initial copy session management table 180 are information regulating a continuous storage area within one logical unit on the transmission system side (hereafter, referred to as "copy source storage area") where backup of data has to be performed. The copy destination LUN, copy destination LBA, and the number of blocks are information regulating a continuous storage area within one logical unit on the reception system side (hereafter, referred to as "copy destination storage area") where data within the copy source storage area has to be stored.

The initial copy state is information indicating whether or not initial copy processing (FIG. 11; details will be described later) regarding the own table 180 has been started.

The session phase is information indicating whether or not the initial copy processing regarding the own table 180 has been completed. This session phase is changed to "Equivalent" at the time of completion of the initial copy processing regarding the own table 180. The session status is information to be changed to "Suspend" when it is instructed to separate between the reception system 100 and transmission system 100.

At the time of the copy range setup task, the user sets initial copy session information (copy source LUN, copy destination LUN, copy source LBA, copy destination LBA, and the number of blocks) for each storage area intended to be a copy source storage area using the host 300.

Figure 10:
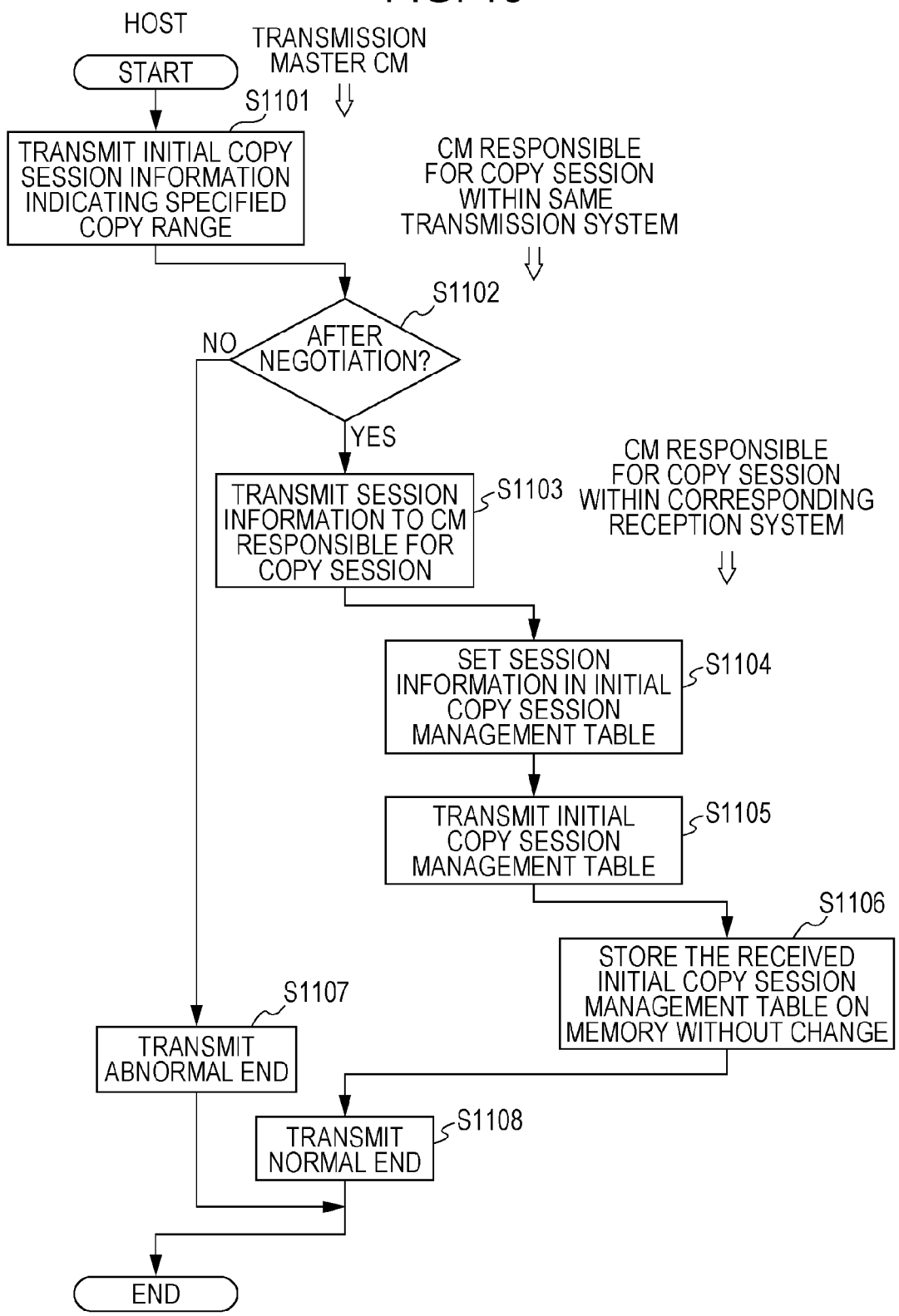
FIG. 10 is a flowchart of processing to be executed within a storage system network according to an embodiment at the time of a copy range setup task.

The initial copy session information set by the user is, as schematically illustrated in FIG. 10, transmitted to the master CM within the transmission system 100 including a copy source logical unit from the host 300 (operation S1101).

The transmission master CM which has received the initial copy session information determines whether or not the negotiation state on the group management table 150 is "after negotiation" (operation S1102). In the case that the negotiation state is not "after negotiation" (operation S1102; NO), the transmission master CM transmits abnormal termination (information to the effect that the processing has abnormally been terminated) to the host 300 (operation S1107). The transmission master CM then ends the processing.

In the case that the negotiation state is "after negotiation" (operation S1102; YES), the transmission master CM transmits the initial copy session information to the CM responsible for copy session (operation S1103). The CM responsible for copy session mentioned here is a CM 110 responsible for control of a logical unit identified by copy source LUN within the initial copy session information to be processed. Note that in the case that the transmission master CM is a CM responsible for copy session, the processes in operations S1104 and S1105 are executed by the transmission master CM which is the CM responsible for copy session without the processing in operation S1103 being executed.

The CM responsible for copy session which has received the initial copy session information generates, in operation S1104, a unique session ID (session ID different from session IDs generated in the past which are valid at the present time). The CM responsible for copy session generates an initial copy session management table 180 to which the generated session ID, "Active", "Copying", received initial copy session information, and "unactivated" have been set as the session ID, session status, session phase, initial copy session information, and initial copy state, on the memory 112.

The CM responsible for copy session which has finished the processing in operation S1104 transmits the generated initial copy session management table 180 to a CM responsible for copy session within the corresponding reception system 100 (operation S1105). The CM responsible for copy session within the corresponding reception system 100 stores the received initial copy session management table 180 on the own memory 112 (operation S1106), and then informs the transmission master CM that the processing has been completed.

The transmission master CM to which completion of the processing has been informed transmits normal termination (information to the effect that the processing has normally been terminated) to the host 300 (operation S1108). Thus, processing for generating one initial copy session management table 180 on the memory 112 of one transmission CM has been completed.

Hereinafter, description will be made regarding various types of processing that the CM 110 executes independently or in collaboration with another CM 110.

Initial Copy Processing

Figure 11:
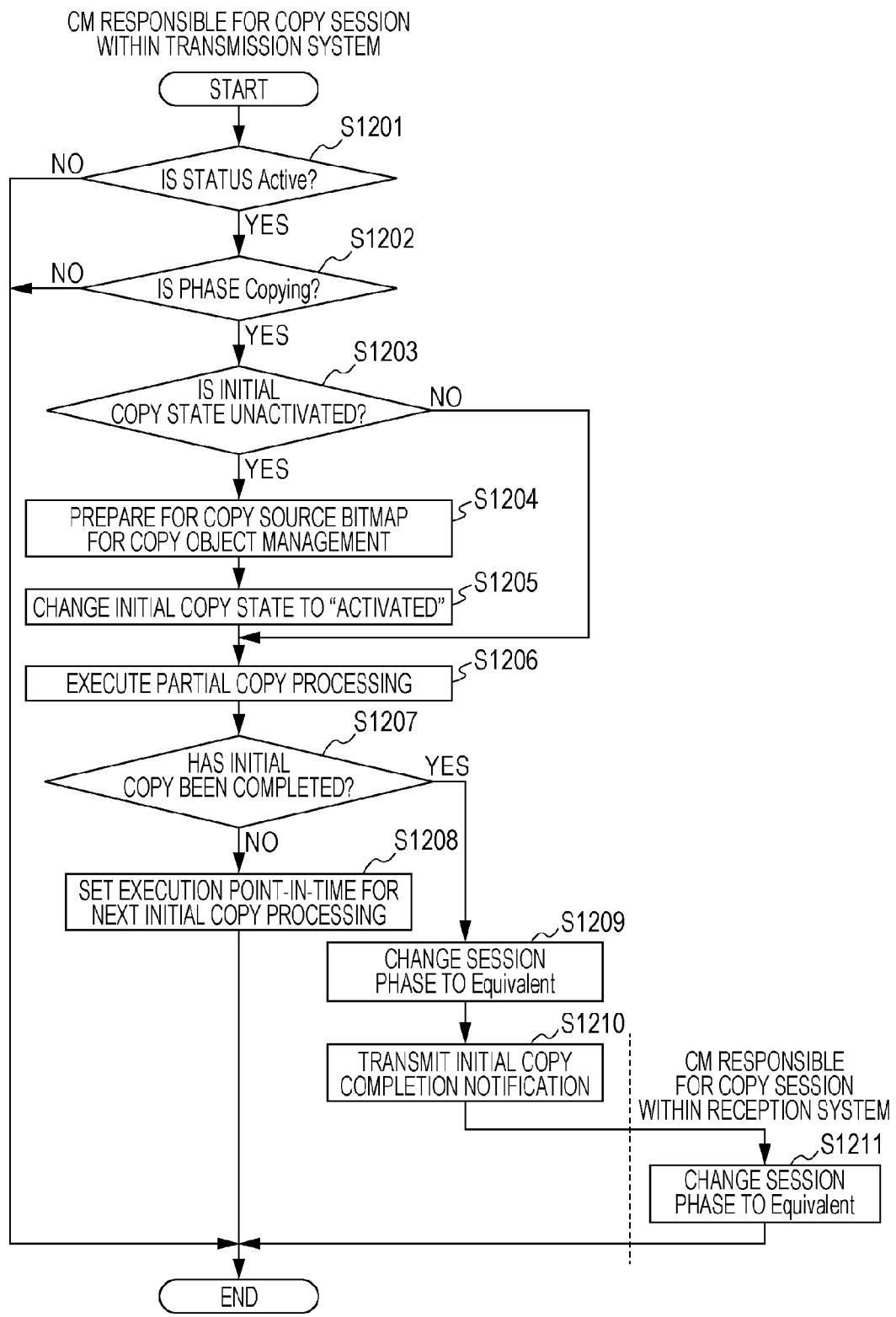
FIG. 11 is a flowchart of initial copy processing.

The CM responsible for copy session which has generated the initial copy session management table 180 on the own memory 112 starts initial copy processing of a procedure illustrated in FIG. 11. The CM responsible for copy session first determines whether or not the session status on the initial copy session information table is "Active" (operation S1201).

In the case that the session status is not "Active" (operation S1201; NO), the CM responsible for copy session ends the initial copy processing.

In the case that the session status is "Active" (operation S1201; YES), the CM responsible for copy session determines whether or not the session phase is "Copying" (operation S1202). In the case that the session phase is not "Copying" (operation S1202; NO), the CM responsible for copy session ends the initial copy processing.

Also, in the case that the session phase is "Copying" (operation S1202; YES), the CM responsible for copy session determines whether or not the initial copy sate is "unactivated" (operation S1203). In the case that the initial copy state is "unactivated" (operation S1203; YES), the CM responsible for copy session prepares for copy source bitmap for copy object management on the own memory 112 (operation S1204). The copy source bitmap for copy object management mentioned here is that each bit is data (bitmap data) indicating whether or not data on a particular storage area has to be copied.

The CM responsible for copy session which has finished the processing in operation S1204 changes the initial copy state on the initial copy session management table 180 to "activated" (operation S1205). Next, the CM responsible for copy session performs partial copy processing for copying part of data scheduled to be copied in copy source bitmap to copy destination, and reversing the value of a bit within the copy source bitmap regarding the data to be copied (operation S1206).

The CM responsible for copy session which has finished the partial copy processing determines whether or not the initial copy (copy of contents specified in the initial copy session information table 180) has been completed (operation S1207). In the case that the initial copy has not been completed (operation S1207; NO), the CM responsible for copy session sets execution point-in-time (date) for the next initial copy processing (operation S1208), and then ends this initial copy processing.

As can be apparent from the above description, at the time of execution of the second initial copy processing and thereafter, the initial copy state is "activated". Therefore, in operation S1203, the CM responsible for copy session branches to the "NO" side. That is to say, the CM responsible for copy session executes the partial copy processing in operation S1206 without performing the processes in operations S1204 and S1205.

As a result of repeating the processing as described above, in the event that the initial copy has been completed (operation S1207; YES), the CM responsible for copy session changes the session phase on the initial copy session management table 180 to "Equivalent" (operation S1209). The CM responsible for copy session then transmits an initial copy completion notification to the CM responsible for copy session within the corresponding reception system (operation S1210).

The CM responsible for copy session within the corresponding reception system which has received this notification changes the session phase on the initial copy session management table 180 to "Equivalent" (operation S1211), and then informs completion of the processing to the CM responsible for copy session within the transmission system.

Write Request Analysis/Reply Processing

Figure 12:
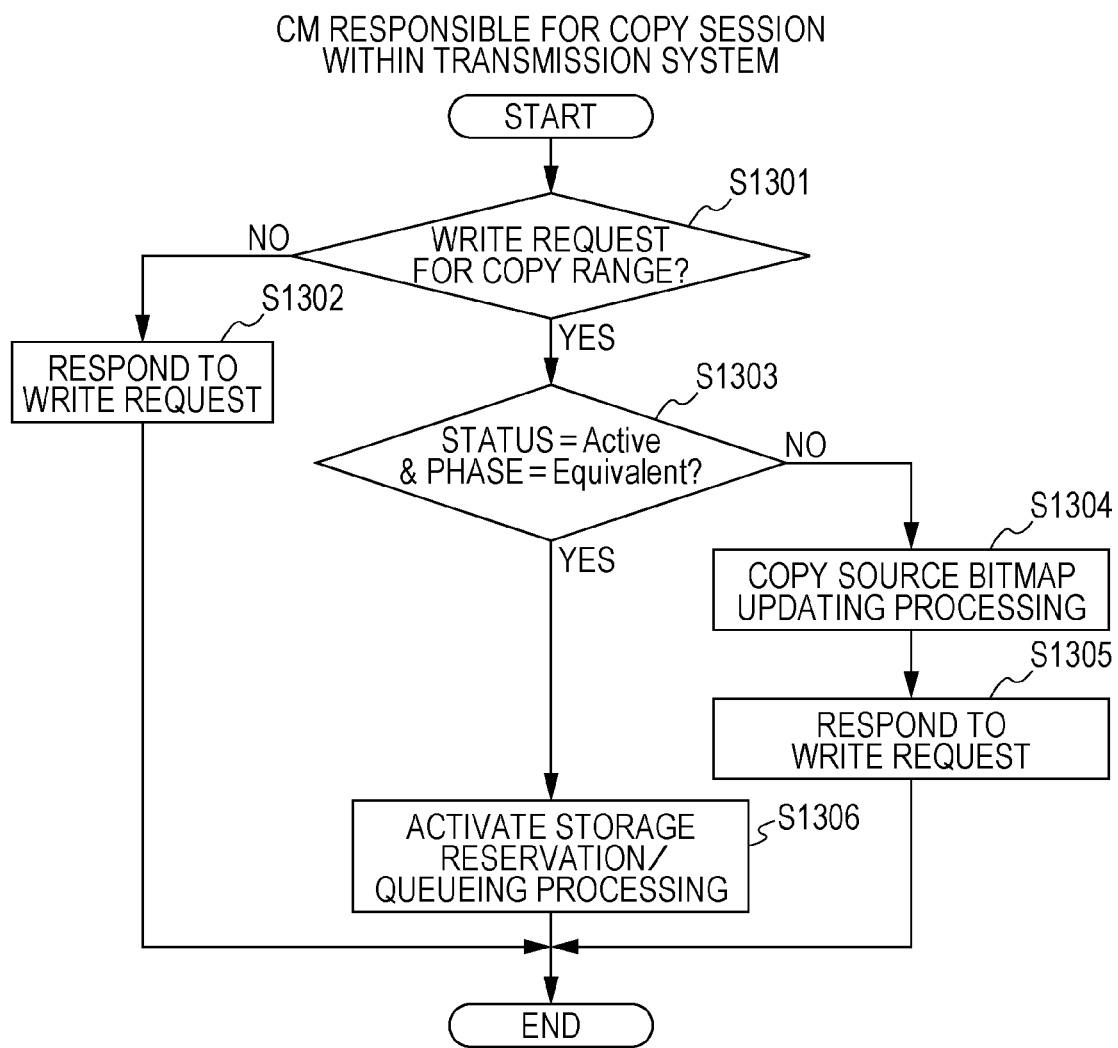
FIG. 12 is a flowchart of write request analysis/reply processing to be executed at the time of reception of a write request.

Write request analysis/reply processing is executed by a transmission CM which has received a write request from the host 300, and is processing of a procedure illustrated in FIG. 12. Note that, as already described, the host 300 transmits a write request as to a certain logical unit to a transmission CM responsible for the logical unit thereof. Accordingly, it is the CM responsible for copy session to execute this write request analysis/reply processing.

As illustrated in FIG. 12, the CM responsible for copy session which has received the write request first determines whether or not this write request is a write request for any copy range (copy source storage area) of which the own CM takes care (operation S1301). More specifically, in this operation S1301, the CM responsible for copy session determines whether or not there is the initial copy session management table 180 (FIG. 9) where the write range of the data of the received write request, and the copy source storage area are overlapped on the memory 112. Note that, in the case that there is such an initial copy session management table 180, the CM responsible for copy session stores the copy destination LUA set onto this initial copy session management table 180 as a transfer destination LUA. Also, the CM responsible for copy session obtains, based on the copy source LBA and copy destination LBA set within this initial copy session management table 180, an LBA within the copy destination LUA corresponding to a LBA that is being write-requested, and stores the obtained LBA as a transfer destination LBA.

In the case that the received write request is not a write request for any copy range (operation S1301; NO), the CM responsible for copy session performs only processing for replying to the received write request (operation S1302). The processing for replying to the received write request mentioned here is processing for performing writing of the data of contents requested for this write request on the storage unit 120, and then transmitting a termination notification to the host 300.

The CM responsible for copy session which has replied to the write request then ends this write request analysis/reply processing.

On the other hand, in the case that the received write request is a write request for any of copy ranges (operation S1301; YES), the CM responsible for copy session determines whether or not the status and phase of the initial copy session regarding this copy range are "Active" and "Equivalent", respectively (operation S1303).

As already described above, the phase of a certain initial copy session does not become "Equivalent" unless copy in the range specified by the user is not completed. Accordingly, in the case that the phase of the range overlapped initial copy session where the writing range of a write request and the copy range are overlapped is not "Equivalent", this means that copy of data has not been completed up to a level wherein sequentiality for writing of data has to be ensured. Also, it is when the user instructs separation of the reception system that the status of a certain initial copy session becomes "Suspend". Accordingly, in the case that the status of the range overlapped initial copy session is not "Active" as well, sequentiality for writing of data does not have to be ensured.

Therefore, in the event that relationship of the status="Active" and also the phase="Equivalent" is unsatisfied (operation S1303; NO), the CM responsible for copy session performs copy source bitmap updating processing (operation S1304). The copy source bitmap updating processing mentioned here is processing for updating copy source bitmap so as to copy the write range of the write request being processed at the initial copy processing. Note that though this copy source bitmap updating processing includes a name of "updating processing", this is processing wherein in the event that the write range of the write request being processed is a range that has not been copied at the initial copy processing, the contents of copy source bitmap are not changed.

The CM responsible for copy session which has finished the processing in operation S1304 replies to the write request (operation S1305). The CM responsible for copy session then ends this write request analysis/reply processing.

On the other hand, in the case that relationship of the status="Active" and also the phase="Equivalent" is satisfied (operation S1303; YES), the CM responsible for copy session activates storage reservation/queuing processing (operation S1306) corresponding to the received write request. Note that "a certain CM 110 responsible for copy session activates some processing" means "this certain CM 110 responsible for copy session starts some processing as separate processing without interrupting processing being executed."

The CM responsible for copy session then ends this write request analysis/reply processing.

Storage Reservation/Queuing Processing

Figure 13:
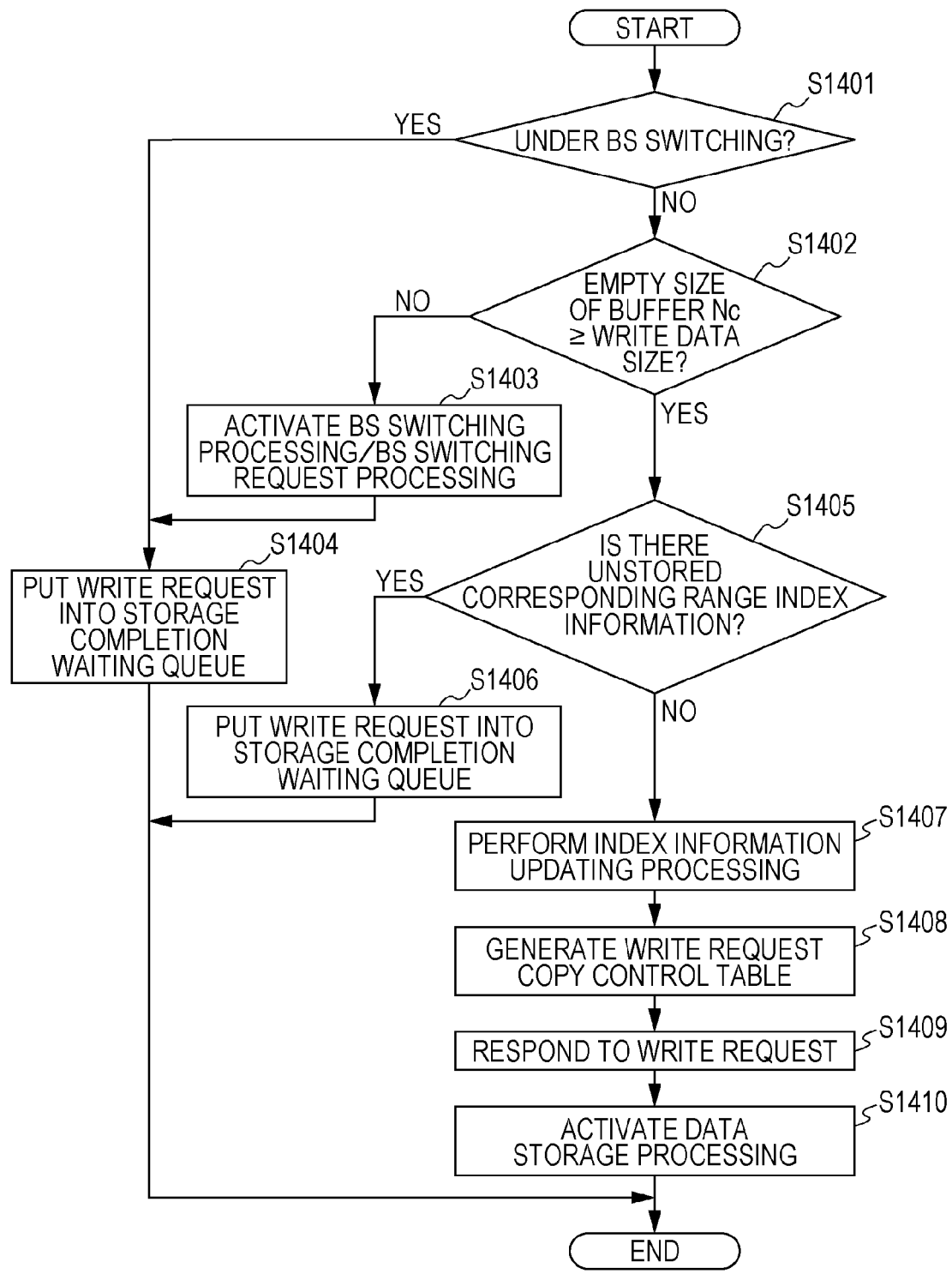
FIG. 13 is a flowchart of storage reservation/queuing processing.

The storage reservation/queuing processing is processing of a procedure illustrated in FIG. 13. Note that, with the following description, Nc means a buffer set number on the group management table 150 at the time thereof. Also, "buffer Nc, buffer management table Nc" means "buffer, buffer management table for transmission-side buffer set Nc".

As illustrated in FIG. 13, the CM responsible for copy session which has started the storage reservation/queuing processing first determines whether or not the buffer set is under switching (the BS switching state on the group management table 150 is "switching") (operation S1401).

In the case that the buffer set is under switching (operation S1401; YES), the CM responsible for copy session puts a write request in a BS switching waiting queue (operation S1404). The CM responsible for copy session then ends this storage reservation/queuing processing.

On the other hand, in the case that the buffer set is not under switching (operation S1401; NO), the CM responsible for copy session determines whether or not the empty size of the buffer Nc is equal to or greater than the size of this write data (operation S1402). More specifically, the CM responsible for copy session calculates the empty size of the buffer Nc "(1024−m)×8 KB" from the value m of an index information pointer on the buffer management table Nc. The CM responsible for copy session then determines whether or not the calculated empty size of the buffer Nc is equal to or greater than the size of this write data.

The contents of processing to be executed in the case that the empty size of the buffer Nc is less than the size of the write data differs depending on whether or not the CM responsible for copy session which is executing this storage reservation/queuing processing is the main transmission master CM. The CM responsible for copy session which is a slave CM or sub transmission master CM activates, in the case that the empty size of the buffer Nc is less than the size of the write data (operation S1402; NO), buffer set switching request processing (details will be described later) (operation S1403). Also, the CM responsible for copy session which is a master CM activates, in the case that the empty size of the buffer Nc is less than the size of the write data (operation S1402; NO), buffer set switching processing (details will be described later) (operation S1403).

The CM responsible for copy session which has finished the processing in operation S1403 puts the write request in the buffer set switching waiting queue (operation S1404), and then ends this storage reservation/queuing processing.

On the other hand, in the case that the empty size of the buffer Nc is equal to or greater than the size of the write data (operation S1402; YES), the CM responsible for copy session determines whether or not there is unstored corresponding range index information on any of the buffer management tables regarding the buffer set being used (operation S1405). "The buffer management table regarding the buffer set being used" mentioned here means a buffer set wherein the use state ("buffer set n use state") on the group management table 150 is "being used". Also, the unstored corresponding range index information (see FIG. 8) mentioned here means index information wherein the storage state is "unstored", and the storage area that the copy destination LUN, copy destination LBA, and the number of blocks indicate is overlapped with the writing range of this write data.

In the case that there is no unstored corresponding range index information (operation S1405; NO), the CM responsible for copy session performs index information updating processing (operation S1407).

At the time of this index information updating processing, the CM responsible for copy session first generates a unique session number Snew. Next, the CM responsible for copy session stores the size of the write data as the current data size, and also stores the value of the index information pointer at the current point on the buffer management table Nc as m and m0. The CM responsible for copy session performs the following processing using the transfer destination LUN and transfer destination LBA of which the values are determined at the time of the processing (determination) in operation S1301.

The CM responsible for copy session first performs transfer destination LUN etc. setting processing for setting the Snew, transfer destination LUN, transfer destination LBA, and &H10 in the buffer management table Nc as the session number of the index information m, LUN, LBA, and the number of blocks, respectively.

Next, the CM responsible for copy session performs processing for incrementing the value of the index information pointer on the buffer management table Nc by "1", and the following calculation processing.

$m=m+1$ current data size=current data size −8 KB
transfer destination LBA=transfer destination LBA+ &H10

Thereafter, the CM responsible for copy session determines whether or not the current data size >8 KB is satisfied. In the case that the current data size >8 KB is satisfied, the CM responsible for copy session executes the above-mentioned transfer destination LUN etc. setting processing and thereafter again.

On the other hand, in the case that the current data size 8 KB is satisfied, the CM responsible for copy session sets the Snew, transfer destination LUN, transfer destination LBA, and the current data size in increments of the number of blocks in the buffer management table Nc as the session number, LUN, LBA, and the number of blocks, respectively.

The CM responsible for copy session then increments the value and m value of the index information pointer on the buffer management table Nc by "1" respectively, and then ends the index information updating processing (operation S1407).

The CM responsible for copy session which has finished the index information updating processing generates a write request copy control table for enabling the write data to be read out from the storage unit 120 and to be stored in the storage region in the unit storage area m0 and thereafter of the buffer Nc, on the memory 112 (operation S1408).

More specifically, the CM responsible for copy session generates a write request copy control table 190 having the configuration illustrated in FIG. 14 where the following information is set as various types of information, on the memory 112.

Write request copy control name: unique name automatically generated
Copy source LUN: LUN of writing destination logical unit of write data
Copy source LBA: address (LBA) of writing start logical block of write data
Number of blocks: the number of blocks of write data
Buffer set number: Nc
Storage area offset: m0
Number of index information: m−m0
Session number: Snew The CM responsible for copy session then replies to the write request (operation S1409), activates data storage processing as to the generated write request copy control table 190 (operation S1410), and then ends this storage reservation/queuing processing.

Data Storage Processing

Figure 15:
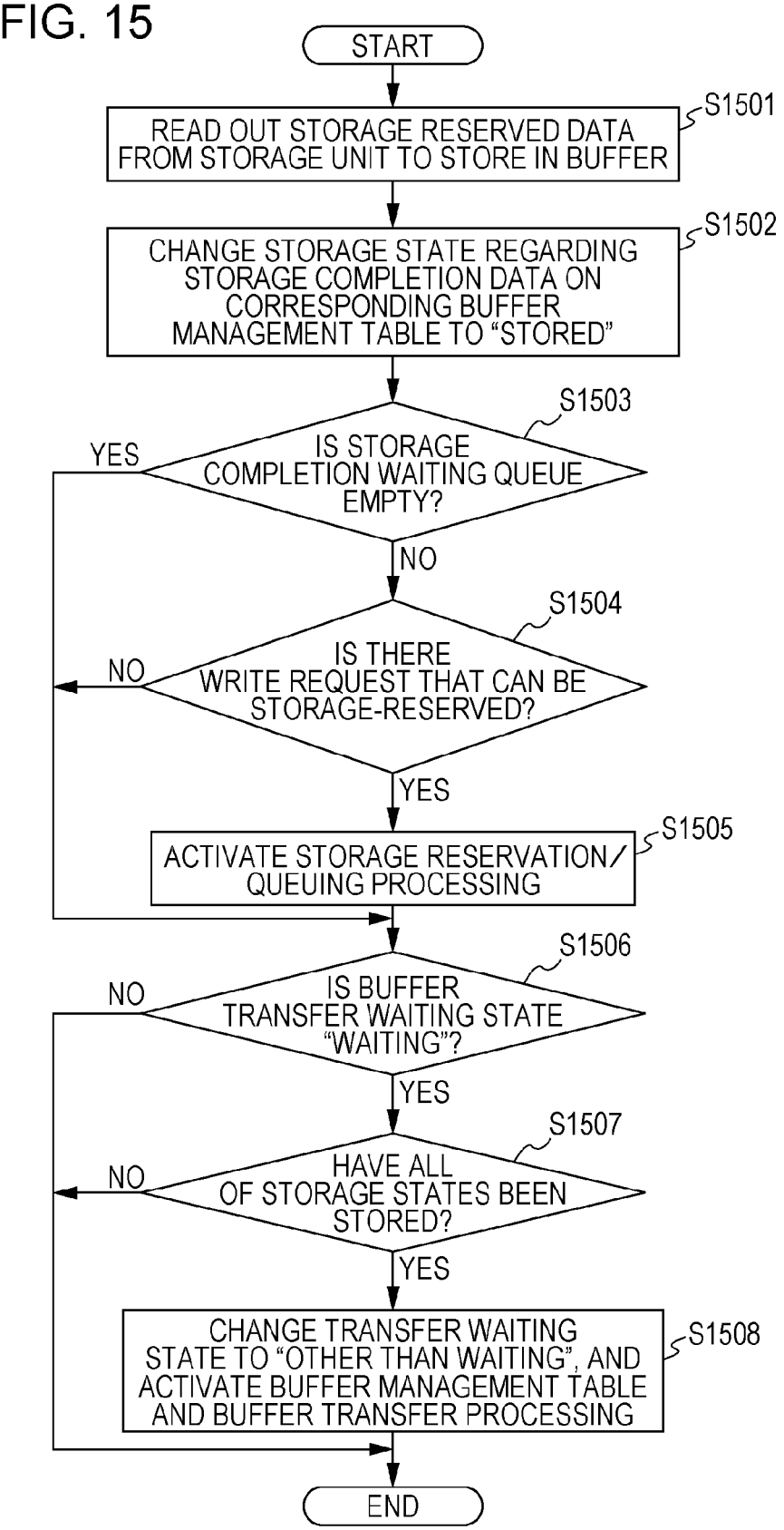
FIG. 15 is a flowchart of data storage processing.

The data storage processing is processing of a procedure illustrated in FIG. 15.

Specifically, the CM responsible for copy session which has started the data storage processing as to a certain write request copy control table 190 first performs processing for reading out storage reserved data from the storage unit 120 to store in the buffer based on the information on this table 190 (operation S1501). More specifically, the CM responsible for copy session reads out data stored in the storage area that the copy source LUN, copy source LBA, and the number of blocks on the write request copy control table 190 indicate from the storage unit 120. Upon the BS number and storage area offset on the write request copy control table 190 being referred to as n1 and n2, the CM responsible for copy session stores the read data in the storage areas of the unit storage area n2 and thereafter of the buffer n1.

The CM responsible for copy session which has finished the processing in operation S1501 changes the storage states of a single or plurality of index information regarding the data stored in the buffer to "stored" (operation S1502).

Thereafter, the CM responsible for copy session determines whether or not the storage completion waiting queue is empty (operation S1503). In the case that the storage completion waiting queue is not empty (operation S1503; YES), the CM responsible for copy session determines whether or not a write request of which storage reservation has been enabled is queued in the storage completion waiting queue (operation S1504). In the case that a write request of which storage reservation has been enabled is queued in the storage completion waiting queue (operation S1504; YES), the CM responsible for copy session fetches this write request from the storage completion waiting queue, and activates the storage reservation/queuing processing (FIG. 13) corresponding to the fetched write request (operation S1505).

The CM responsible for copy session which has finished the processing in operation S1505 determines whether or not the buffer transfer waiting state on the buffer management table is "waiting" (operation S1506).

In the case that the storage completion waiting queue is empty (operation S1503; YES), the CM responsible for copy session performs the processing (determination) in operation S1506 without performing the processing in operation S1505. Also, in the case that a write request of which storage reservation has been enabled is not queued in the storage completion waiting queue (operation S1504; NO), the CM responsible for copy session performs the processing in operation S1506 without performing the processing in operation S1505.

In the case that the buffer transfer waiting state on the buffer management table is "waiting" (operation S1506; YES), the CM responsible for copy session determines whether or not all of the storage states on the buffer management table are "stored" (operation S1507). In the case that some storage states on the buffer management table are "unstored" (operation S1507; NO), the CM responsible for copy session ends this storage processing. Also, the CM responsible for copy session also ends this storage processing in the case that the transfer waiting state on the buffer management table is not "waiting" (operation S1506; NO).

In the case that the storage states on the buffer management table are "stored" (operation S1507; YES), the CM responsible for copy session changes the transfer waiting state on the buffer management table to "other than waiting" (operation S1508). The CM responsible for copy session then activates buffer management table and buffer transfer processing (FIGS. 21A through 21G) (operation S1508).

Buffer Set Switching Request Processing

Figure 16:
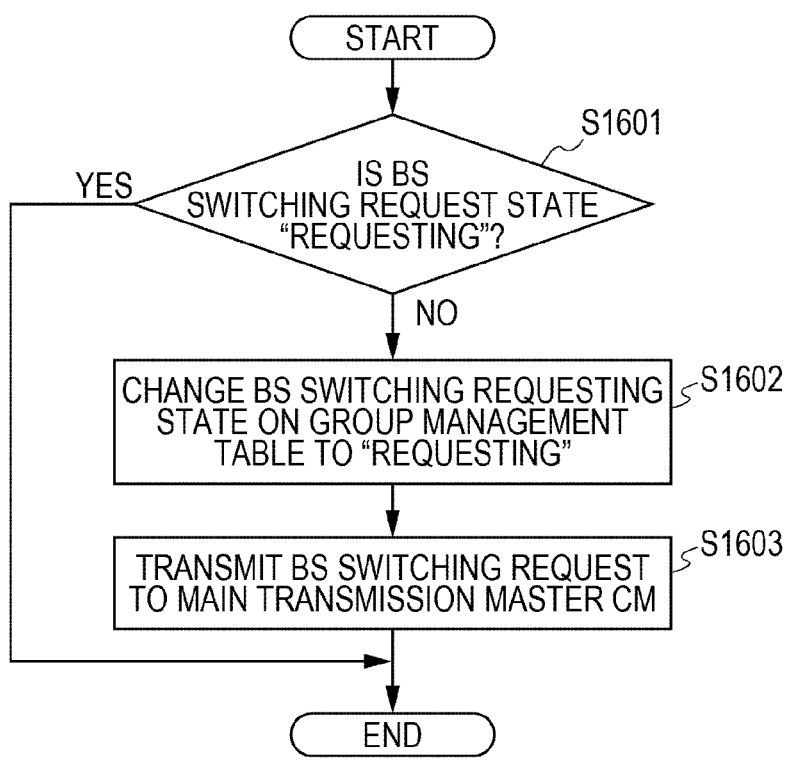
FIG. 16 is a flowchart of buffer set switching request processing.

FIG. 16 illustrates a flowchart of the BS switching request processing.

As already described above, this BS switching request processing is processing that the CM responsible for copy session which is a slave CM or sub transmission master CM executes in the case that the empty size of the buffer Nc is less than the size of the write data.

As illustrated in FIG. 16, the CM responsible for copy session which has started the BS switching request processing first determines whether or not the BS switching request state on the group management table 150 is "requesting" (operation S1601).

In the case that the BS switching request state is not "requesting" (operation S1601; NO), the CM responsible for copy session changes the BS switching request state on the group management table 150 to "requesting" (operation S1602). Next, the CM responsible for copy session transmits a buffer set switching request where a new buffer set number Nnew is set to the main transmission master CM (operation S1603). The new buffer set number Nnew mentioned here is a number (integer value) generated by a predetermined algorithm based on the number of buffer sets Ns and the storage buffer set number Nc at the time thereof, which is equal to or greater than 0 but equal to or smaller than Ns−1, and differs from Nc. Note that examples of "predetermined algorithm" include an algorithm wherein in the event that the Nc is "Ns−1", "0" is set as the new buffer set number Nnew, and in the event that the Nc is not "Ns−1", "Nc+1" is set as the new buffer set number Nnew.

The CM responsible for copy session which has finished transmission of the buffer set switching request (operation S1603) ends this buffer set switching request processing.

On the other hand, in the case that the BS switching request state is "requesting" (operation S1601; YES), the CM responsible for copy session ends this buffer set switching request processing without performing particular processing.

Buffer Set Switching Processing

Figure 17A:
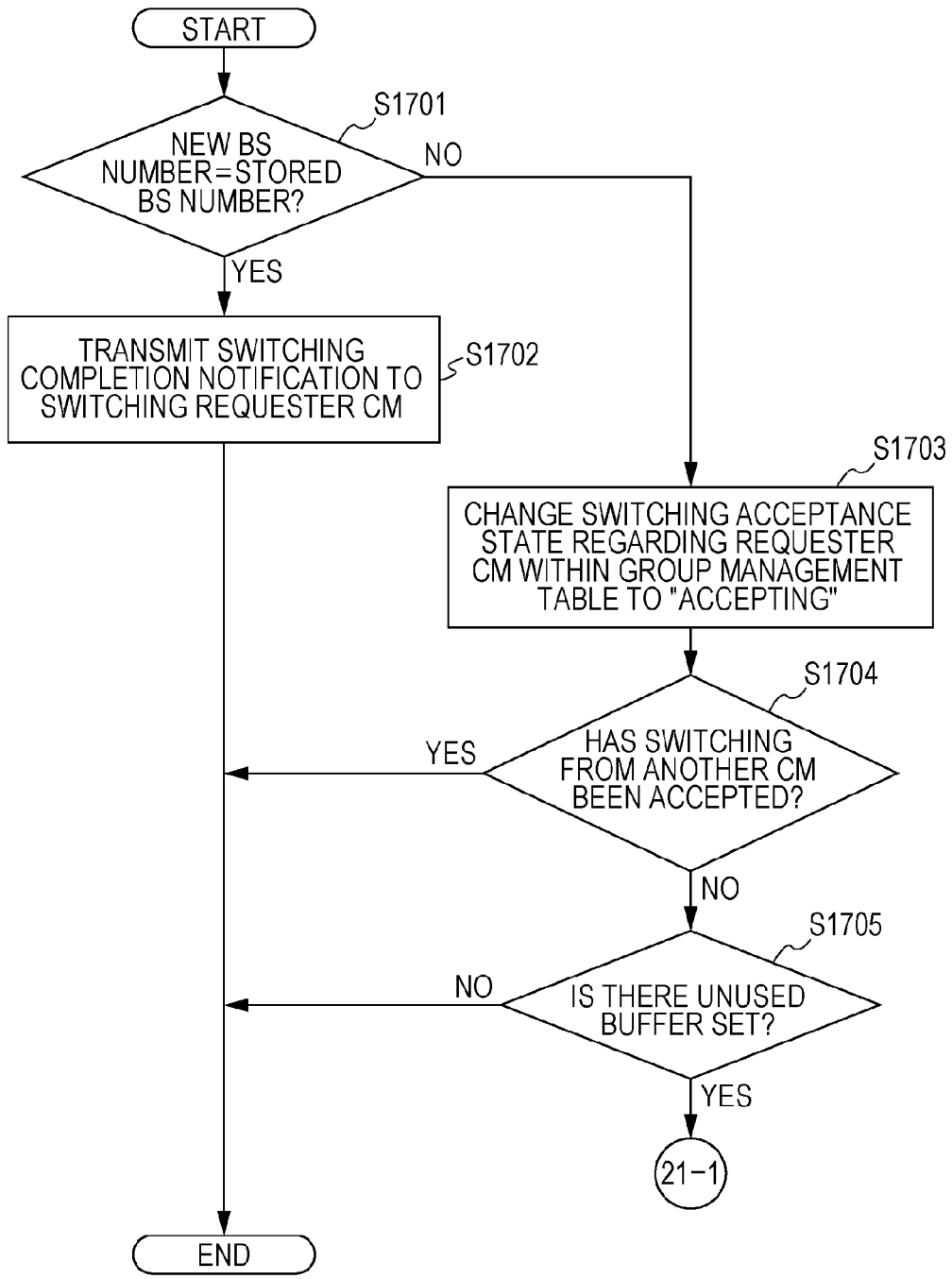
FIG. 17A is a flowchart (Part 1) of buffer set switching processing.

The buffer set switching processing is processing of a procedure illustrated in FIGS. 17A and 17B that the main transmission master CM starts in the event of having received a buffer set switching request, and in the event that the empty size of the buffer Nc is less than the size of write data. Note that, in the event that the empty size of the buffer Nc is less than the size of write data, the main transmission master CM generates (determines) a new buffer set number Nnew, and then starts this buffer set switching processing.

As illustrated in FIG. 17A, the main transmission master CM which has started the buffer set switching processing determines whether or not the new BS number agrees with the stored BS number on the group management table 150 (operation S1701).

In the case that both numbers agree (operation S1701; YES), this means that the buffer set has already been switched to a new buffer set. Therefore, the main transmission master CM transmits a switching completion notification to the switching requester CM (operation S1702), and then ends this buffer set switching processing.

Figure 18:
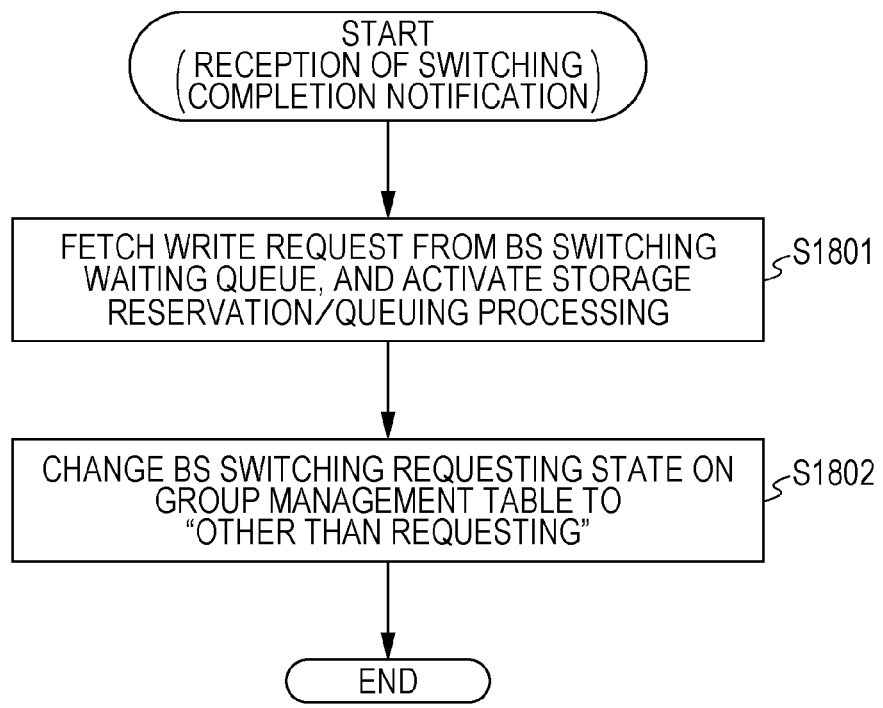
FIG. 18 is a flowchart of processing to be executed by a CM responsible for copy session that has received a switching completion notification.

Note that the CM responsible for copy session which has received the switching completion notification fetches a write request from the BS switching waiting queue as illustrated in FIG. 18, and activates the storage reservation/queuing processing corresponding the fetched write request (operation S1801). The CM responsible for copy session then changes the BS switching requesting state on the group management table 150 to "other than requesting" (operation S1802), and then ends the processing in this drawing.

Now, returning to FIG. 17A, description will be continued regarding the buffer set switching processing.

In the case that the new BS number and the stored BS number do not agree (operation S1701; NO), the main transmission master CM changes the switching request accepted state regarding the switching requester CM on the group management table 150 to "accepting" (operation S1703).

Next, the main transmission master CM determines, based on the switching request accepted state on the group management table 150, whether or not the switching request from another CM (CM 110 different from this switching requester CM) has been accepted (operation S1704).

In the case that the switching request from another CM has been accepted (operation S1704; YES), this means that the processing in FIG. 17B (the main portion of the buffer set switching processing) has already been started. Therefore, the main transmission master CM ends this BS switching processing.

Also, in the case that a switching request from another CM has not been accepted (operation S1704; NO), the main transmission master CM determines whether or not there is an unused buffer set (operation S1705).

The unused buffer set mentioned here is a buffer set holding no data to be transferred to the reception system 100 side at all (i.e., available buffer set as a new buffer set). The details will be described later, but the transmission master CM updates the group management table 150 so that the use state regarding an unused buffer set ("buffer set n use state") becomes "unused" (see FIG. 23B). Accordingly, the main transmission master CM determines whether or not there is an unused buffer set by determining whether or not there is a buffer set of which the use state is "unused". Also, in the case that there is no unused buffer set (operation S1705; NO), the main transmission master CM temporarily ends this buffer set switching processing since there is no available buffer set as a new buffer set. The main transmission master CM then resumes the buffer set switching processing when an unused buffer set is prepared by unloading processing (see FIG. 23B).

In the case that there is an unused buffer set (operation S1705; YES), the main transmission master CM transmits a BS switching state change instruction having predetermined contents to other transmission CMs (main transmission slave CM, sub transmission CM) (FIG. 17B; operation S1710).

The main transmission master CM which has finished transmission of the BS switching state change instruction changes the buffer set switching state on the group management table 150 to "switching" (operation S1711).

Also, the transmission CMs which have received the BS switching state change instruction also change the buffer set switching state on the group management table 150 to "switching" (operation S1711). Thereafter, the transmission CMs inform completion of the processing to the main transmission master CM.

The main transmission master CM which has finished change of the BS switching state stands by for completion of the processing of the other transmission CMs (changing of the BS switching state to "switching") (operation S1712).

In the event of recognizing that the processing by the other transmission CMs has been completed, the main transmission master CM transmits a BS switching request where a new BS number is set as a parameter to the other transmission CMs (operation S1713).

Next, the main transmission master CM changes the stored BS number and BS switching state on the group management table 150 to a new BS number and "other than switching", respectively (operation S1714). Further, the main transmission master CM changes the BS use state regarding a new buffer set (corresponding BS use state in FIG. 17B) on the group management table 150 to "being used" (operation S1714).

The transmission CMs which have received the buffer switching request also performs processing with the same contents as those that the main transmission master CM performs (operation S1714).

The sub transmission master CM which has finished the processing in operation S1714 activates empty reception buffer ID assignment processing as to the old buffer set (buffer set identified by the BS number before change) in an asynchronous manner (operation S1716). "A certain CM 110 activates some processing in an asynchronous manner" means "this CM 110 starts some processing as occasion calls in the event that load has been reduced, or the like in a manner completely unrelated to processing being executed".

The sub transmission master CM then transmits a processing completion notification to the main transmission master CM, and then ends the processing.

Also, the transmission slave CMs which have finished the processing in operation S1714 transmits a processing completion notification to the main transmission master CM without performing the processing in operation S1716, and then ends the processing.

On the other hand, the main transmission master CM which has finished the processing in operation S1714 activates the empty reception buffer ID assignment processing as to the old buffer set (operation S1715). Thereafter, the main transmission master CM stands by for completion of the processes by the other transmission CMs (operation S1717). The main transmission master CM transmits, in the event of having confirmed that the processes by the other transmission CMs have been completed, a switching completion notification to the switching requesters CM of which the switching request states on the group management table 150 are "requesting" (operation S1718), and then ends this BS switching processing.

Empty Reception Buffer ID Assignment Processing

Figure 19:
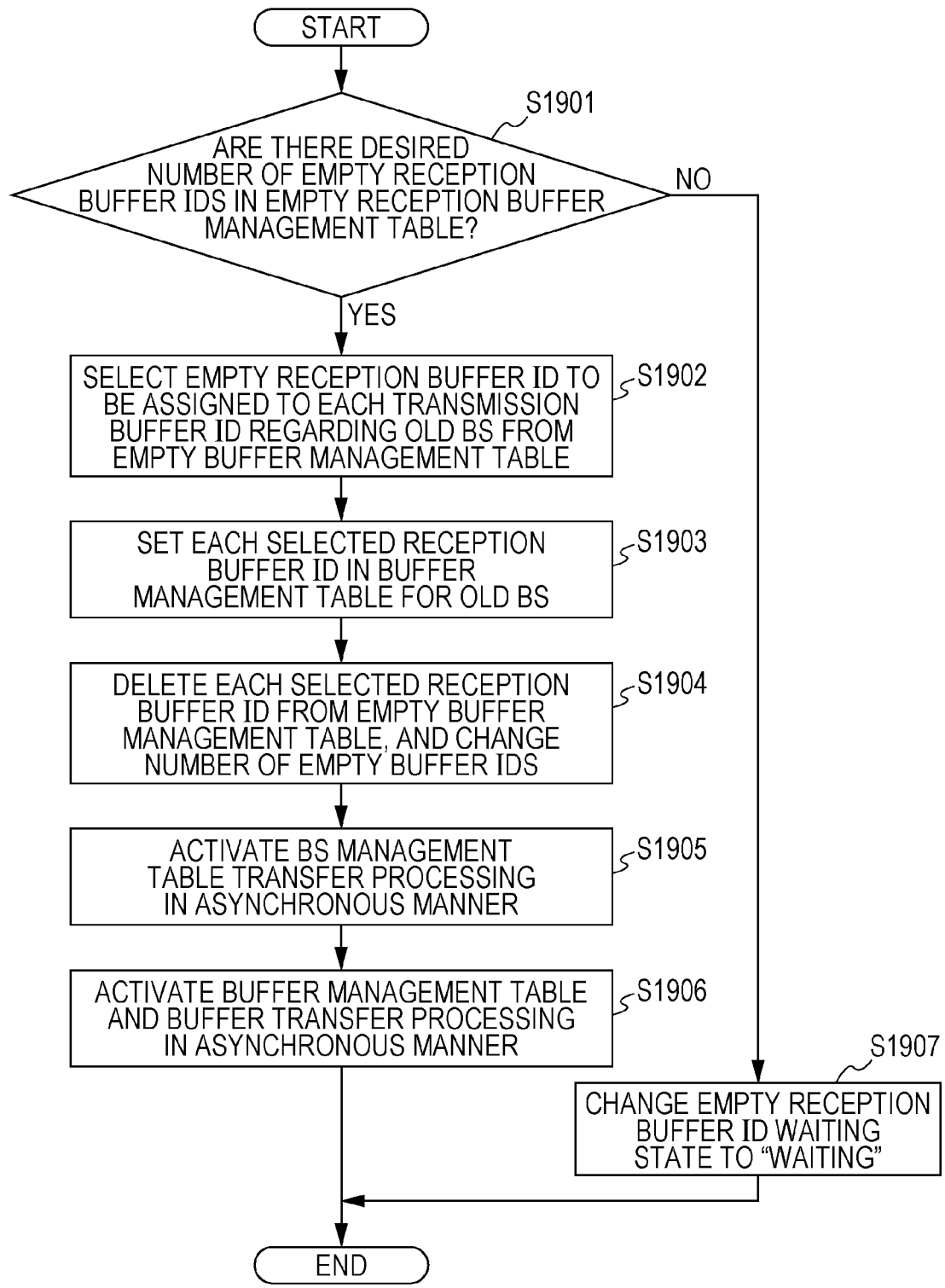
FIG. 19 is a flowchart of empty reception buffer ID assignment processing.

FIG. 19 illustrates a flowchart of the empty reception buffer ID assignment processing.

As already described above, this empty reception buffer ID assignment processing is processing to be performed on an old buffer set (buffer set where writing of the index information in the buffer management table has been completed).

As illustrated in FIG. 19, the transmission master CM which has started the empty reception buffer ID assignment processing first determines whether or not an appropriate number of empty reception buffer IDs are stored in the empty reception buffer management table 160 (operation S1901). The appropriate number of empty reception buffer IDs mentioned here are the same number of empty reception buffer IDs as the number of CMs L installed in the own system.

In the case that an appropriate number of empty reception buffer IDs are not stored in the empty reception buffer management table 160 (operation S1901; NO), the transmission master CM changes the empty reception buffer ID waiting state on the group management table 150 to "waiting" (operation S1907). The transmission master CM then ends this empty reception buffer ID assignment processing.

On the other hand, in the case that an appropriate number of empty reception buffer IDs are stored in the empty reception buffer management table 160 (operation S1901; YES), the transmission master CM selects an empty reception buffer ID to be assigned to each transmission buffer ID regarding the old buffer set out of the empty reception buffer IDs stored in the empty reception buffer management table 160 (operation S1902).

Next, the transmission master CM sets, in the BS management table for the old buffer set, each transmission buffer ID, and also sets the empty reception buffer ID selected regarding each transmission buffer ID as the reception buffer ID corresponding to each transmission buffer ID (operation S1903).

Thereafter, the transmission master CM performs processing for deleting the selected empty reception buffer IDs from the empty reception buffer management table 160, and also changing the number of empty reception buffer IDs on the empty reception buffer management table 160 to a value representing the present situation (operation S1904).

Next, the transmission master CM activates the BS management table transfer processing as to the old buffer set in an asynchronous manner (operation S1905). The transmission master CM then activates the buffer management table and buffer transfer processing as to the old buffer set in an asynchronous manner (operation S1906), and then ends this empty reception buffer ID assignment processing.

Buffer Set Management Table Transfer Processing

FIGS. 20A through 20D illustrate a flowchart of the BS management table transfer processing. Note that with the drawings to be used below for description and the following description, X means the BS number of a buffer set serving as a processing object in certain processing (such as the BS number of the old buffer set, etc.).

As illustrated in FIG. 20A, the transmission master CM which has started the BS management table transfer processing first determines whether or not the BS management table transfer state on the group management table 150 is "transferring" (operation S2101).

In the case that the BS management table transfer state is "transferring" (operation S2101; YES), the transmission master CM changes the transfer waiting state on the BS management table X (BS management table belong to the buffer set X) to "waiting" (operation S2108). The transmission master CM then ends this BS management table transfer processing.

On the other hand, in the case that the BS management table transfer state is not "transferring" (operation S2101; NO), the transmission master CM changes the transfer waiting state on the BS management table X to "transferring" (operation S2102). The transmission master CM transmits the entire information on the BS management table X (hereafter, referred to as "management table information") to the master CM within the corresponding reception system (operation S2103).

Hereinafter, the operation of the reception master CM which has received the management table information will be described by classifying into a case where the corresponding reception system 100 is a sub reception system 100, and a case where the corresponding reception system 100 is the main reception system 100.

Figure 20B:
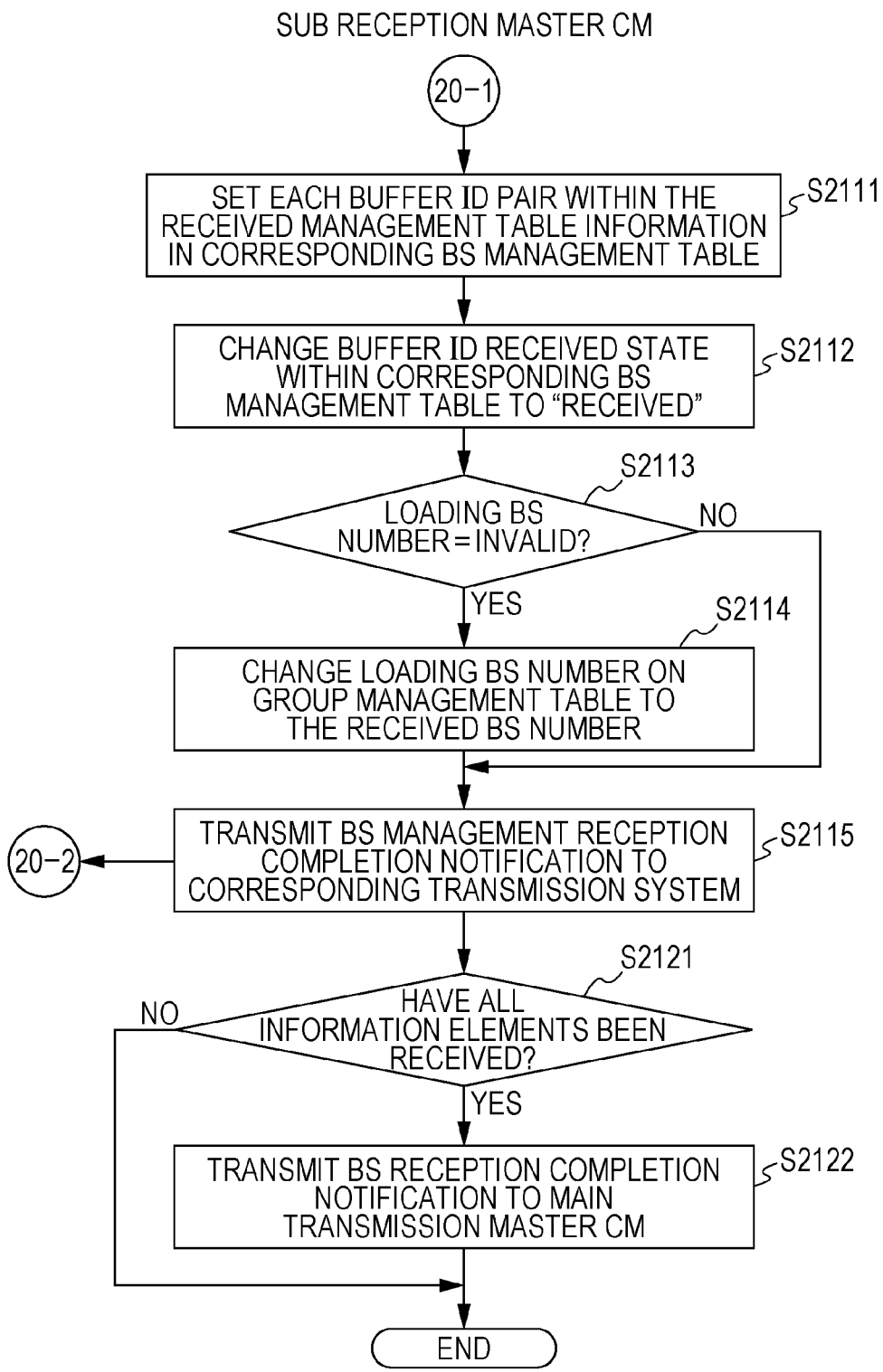
FIG. 20B is a flowchart (Part 2) of the buffer set management table transfer processing.

In the case that the corresponding reception system 100 is the sub reception system 100, the master CM within the corresponding reception system 100 (i.e., sub reception master CM) executes processing of a procedure illustrated in FIG. 20B.

Specifically, the sub reception master CM first sets each transmission buffer ID and reception buffer ID pair within the management table information in the BS management table determined by the BS number of the received management table information (hereafter, referred to as "corresponding BS management table") (operation S2111).

Next, the sub reception master CM changes the buffer ID received state on the corresponding BS management table ("unreceived" at this moment) to "received" (operation S2112).

Thereafter, the sub reception master CM determines whether or not the loading BS number on the group management table 150 is "invalid" (value to be set as an initial value by the initial construction negotiation processing) (operation S2113).

In the case that the loading BS number is "invalid" (operation S2113; YES), the sub reception master CM changes the loading BS number on the group management table 150 to the BS number within the received management table information (operation S2114). The sub reception master CM then transmits a BS management table reception completion notification to the transmission source CM of the management table information (operation S2115).

Also, in the case that the loading BS number is not "invalid" (operation S2113; NO), the sub reception master CM transmits a BS management table reception completion notification to the transmission source CM of the management table information without performing the processing in operation S2114 (operation S2115).

Thereafter, the sub reception master CM determines whether or not reception of all of the element information regarding the buffer set X has been completed (operation S2121). The element information regarding the buffer set X mentioned here means information held in the components (BS management table, some sets of buffer management table and buffer) of the transmission-side buffer set identified by the BS number within the received management table information.

In the case that reception of all of the element information regarding the buffer set X has been completed (operation S2121; YES), the sub reception master CM transmits a BS reception completion notification to the main transmission master CM (operation S2122), and then ends the processing. Also, in the case that reception of all of the element information regarding the buffer set X has not been completed (operation S2121; NO), the sub reception master CM ends the processing without transmitting a BS information reception completion notification.

In the case that the corresponding reception system 100 is the main reception system 100, the master CM within the corresponding reception system 100 which has received the management table information (i.e., main reception master CM) executes processing of a procedure illustrated in FIG. 20C.

That is to say, the main reception master CM which has received the management table information performs the processing in operations S2131 through S2135 having the same contents as with the above-mentioned processing in operations S2111 through S2115, respectively.

The main reception master CM which has finished the processing in operation S2135 determines whether or not reception of all of the element information regarding the buffer set X has been completed (operation S2141). In the case that reception of all of the element information regarding the buffer set X has not been completed (operation S2141; NO), the main reception master CM ends the processing in FIG. 20C without performing particular processing.

On the other hand, in the case that reception of all of the element information regarding the buffer set X has been completed (operation S2141; YES), the main reception master CM changes the reception system 0 received state regarding the buffer set X on the group management table 150 to "received" (operation S2142).

Thereafter, the main reception master CM determines whether or not the received states regarding the systems 100 regarding the buffer set X are all "received" (operation S2143). In the case that the received states regarding the systems 100 regarding the buffer set X are all "received" (operation S2143; YES), the main reception master CM activates loading processing as to the buffer set X in an asynchronous manner (operation S2144), and then ends the processing.

Also, in the case that the received states regarding the systems 100 regarding the buffer set X are not all "received" (operation S2143; NO), the main reception master CM ends the processing without performing the processing in operation S2144.

Now, returning to FIG. 20A, description will be made regarding the operation of the transmission master CM after receiving the BS management table reception completion notification.

The transmission master CM which has received the BS management table reception completion notification changes the BS management table transfer state on the group management table 150 to "other than transferring" (operation S2104).

Next, the transmission master CM determines whether or not there is a BS management table of which the table transfer waiting state is "waiting" ("transfer waiting table" in FIG. 20A) (operation S2105). In the case that there is BS management table of which the table transfer waiting state is "waiting" (operation S2105; YES), the transmission master CM activates the BS management table transfer processing as to this BS management table (operation S2106), and then ends the executed BS management table transfer processing.

Now, the operation of the main transmission master CM which has received the BS reception completion notification will be described with reference to FIG. 20D.

In the event of having received the BS reception completion notification, the main transmission master CM executes processing of a procedure illustrated in this FIG. 20D. Specifically, the main transmission master CM which has received the BS reception completion notification first changes the received states regarding the buffer set X and own system 100 (buffer set X transmission system 0 received state) on the group management table 150 to "received" (operation S2151). Next, the main transmission master CM determines whether or not the received states by system regarding the buffer set X are all "received" (operation S2152). In the case that the received states by system regarding the buffer set X are all "received" (operation S2152; YES), the main transmission master CM activates loading processing as to the buffer set X (operation S2153), and then ends the processing in this drawing. Also, in the case that only a part of the received states by system regarding the buffer set X are "received" (operation S2152; NO), the main transmission master CM ends the processing in this drawing without activating the loading processing.

Buffer Management Table and Buffer Transfer Processing

FIGS. 21A through 21G illustrate a flowchart of the buffer management table and buffer transfer processing.

This buffer management table and buffer transfer processing is processing that the transmission master CM starts. The transmission master CM which has started the buffer management table and buffer transfer processing regarding the buffer set X requests transfer of the buffer management table from the CMs within the own system 100 by informing the BS number X and assigned reception buffer ID (operation S2211).

The assigned reception buffer ID mentioned here is a reception buffer ID stored on the BS management table X (the BS management table of the buffer set X) in a manner correlated with the buffer ID (transmission buffer ID) which is a buffer to be transferred.

The transmission slave CMs to which the assigned reception buffer ID and so forth have been informed set the assigned reception buffer ID in the buffer management table X as a reception buffer ID (operation S2212). Also, the transmission master CM which has finished the processing in operation S2211 also sets the assigned reception buffer ID in the buffer management table X as a reception buffer ID (operation S2212).

Next, the transmission CMs determine whether or not all of the storage states within the index information 0 through m−1 (m is the value of the index information pointer at that time thereof) on the buffer management table X are "stored" (operation S2213). That is to say, the transmission CMs determine whether or not storage reserved data are all stored in the buffer to be transferred (operation S2213).

In the event that there is storage reserved data that of which storing is not completed in the buffer to be transferred (operation S2213; NO), the transmission CMs change the buffer transfer waiting state on the buffer management table X to "waiting" (operation S2214). The transmission CMs then end this buffer management table and buffer transfer processing.

On the other hand, in the case that storing of all of the storage reserved data to the buffer to be transferred has been completed (operation S2213; YES), the transmission CMs transmit the buffer management table X (all of the information on the buffer management table X) to the corresponding reception CM (operation S2215).

The reception CM which has received the buffer management table X stores the received table in the memory 112 without change (operation S2216). The reception CM then informs reception completion of the buffer management table to the corresponding transmission CM (operation S2217).

Hereinafter, the operation of the reception CM after the processing in operation S2217 will be described by classifying into a case where the reception CM is a slave CM, and a case where the reception CM is a master CM.

In the case that the reception CM is a slave CM, the reception CM (reception slave CM) which has finished the processing in operation S2217 executes processing of a procedure illustrated in FIG. 21B.

Specifically, the reception slave CM informs reception completion of the buffer management table to the master CM within the own system (operation S2231), and then ends the processing started by reception of the buffer management table.

On the other hand, the reception master CM to which reception completion of the buffer management table has been informed changes the buffer management table received state regarding the reception completion notification source CM on the BS management table X to "received" (operation S2232), and then ends the processing.

Also, in the case that the reception CM is a master CM, the reception CM (reception master CM) which has finished the processing in operation S2217 executes processing of a procedure illustrated in FIG. 21C.

Specifically, the reception master CM changes the buffer management table received state regarding the own CM 110 on the BS management table X to "received" (operation S2235), and then ends the processing.

Now, returning to FIG. 21A, description of the buffer management table and buffer transfer processing will be continued.

The transmission slave CM to which reception completion of the buffer management table has been informed informs transfer completion of the buffer management table to the transmission master CM (operation S2218).

The transmission master CM to which transfer completion of the buffer management table has been informed requests transfer of the buffer from the CMs 110 within the own system 100 by informing the BS number X and assigned reception buffer ID (operation S2221).

The transmission CMs (transmission master CM, transmission slave CM) from which transfer of the buffer has been requested transmit the assigned reception buffer ID and data on the buffer X (hereafter, referred to as "buffer data") to the corresponding reception CM (operation S2222).

The reception CM which has received the assigned reception buffer ID and buffer data stores the received buffer data in the reception buffer identified by the received assigned reception buffer ID (operation S2223), and then informs reception completion to the corresponding transmission CM (operation S2224).

Hereinafter, the operation of the reception CM after the processing in operation S2224 will be described by the type of the reception CM.

Figure 21D:
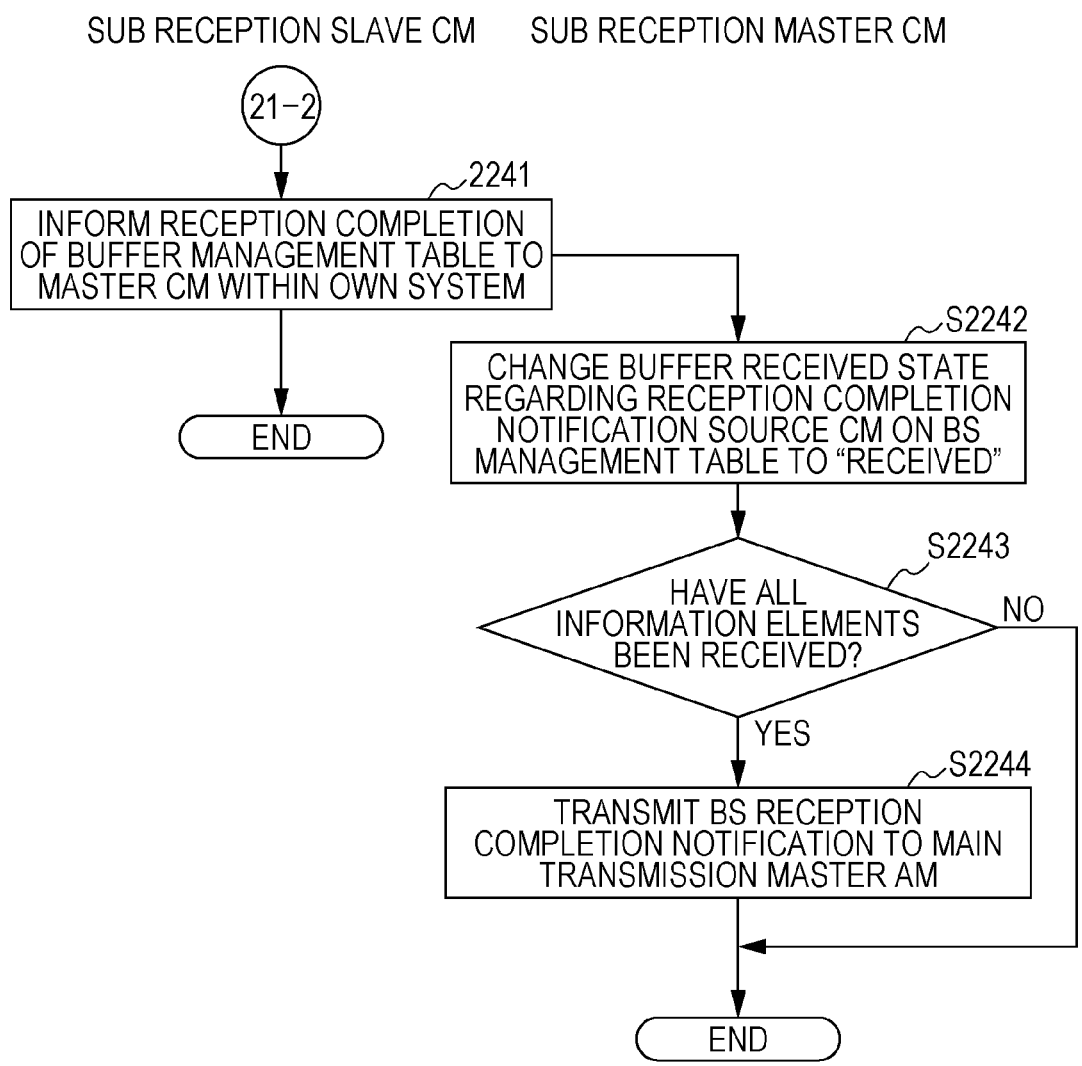
FIG. 21D is a flowchart (Part 4) of the buffer management table and buffer transfer processing.

In the case that the reception CM is a sub reception slave CM, the reception CM (sub reception slave CM) which has finished the processing in operation S2224 executes processing of a procedure illustrated in FIG. 21D.

Specifically, the sub reception slave CM informs reception completion of the buffer management table to the master CM within the own system (operation S2241), and then ends the processing.

On the other hand, the sub reception master CM to which reception completion of the buffer management table has been informed changes the buffer received state regarding the reception completion notification source CM on the BS management table X to "received" (operation S2242). Thereafter, the sub reception master CM determines whether or not reception of all of the element information regarding the buffer set X has been completed (operation S2243).

In the case that reception of all of the element information regarding the buffer set X has been completed (operation S2243; YES), the sub reception master CM transmits a BS reception completion notification to the main transmission master CM (operation S2244), and then ends the processing. Also, in the case that reception of all of the element information regarding the buffer set X has not been completed (operation S2243; NO), the sub reception master CM ends the processing without transmitting a BS information reception completion notification.

Figure 21E:
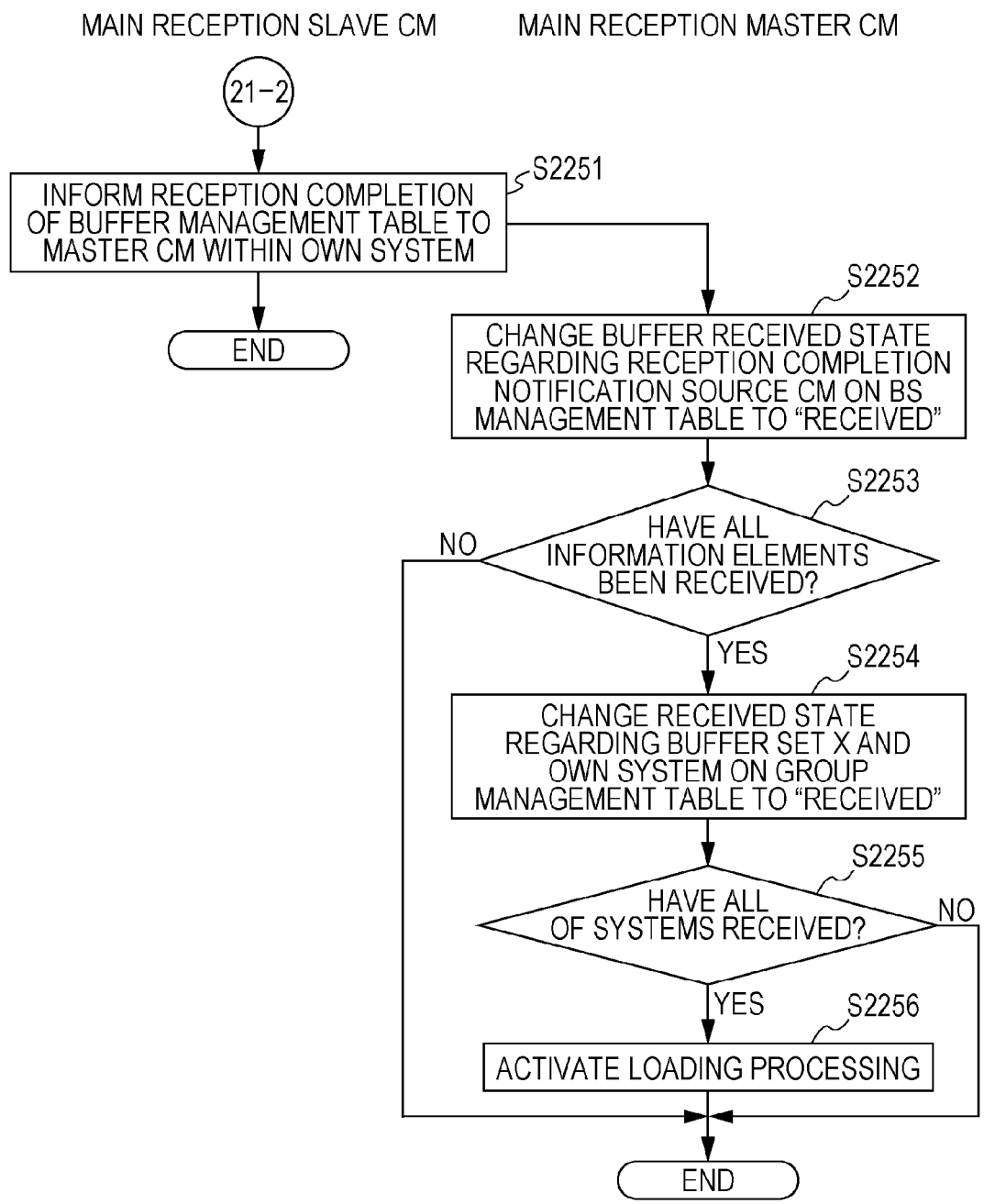
FIG. 21E is a flowchart (Part 5) of the buffer management table and buffer transfer processing.

In the case that the reception CM is a main reception slave CM, the reception CM which has finished the processing in operation S2224 (main reception slave CM) executes processing of a procedure illustrated in FIG. 21E.

Specifically, the main reception slave CM informs reception completion of the buffer management table to the master CM within the own system 100 (operation S2251), and then ends the processing.

The main reception master CM to which reception completion of the buffer management table has been informed changes the buffer received state regarding the reception completion notification source CM on the BS management table X to "received" (operation S2252). Thereafter, the main reception master CM determines whether or not reception of all of the element information regarding the buffer set X has been completed (operation S2253).

In the case that reception of all of the element information regarding the buffer set X has been completed (operation S2253; YES), the main reception master CM changes the received states regarding the buffer set X and the own system (reception system 0) on the group management table 150 to "received" (operation S2254). Thereafter, the main reception master CM determines whether or not the received states by system regarding the buffer set X are all "received" (operation S2255).

In the case that the received states by system regarding the buffer set X are not all "received" (operation S2255; NO), the main reception master CM then ends the processing.

Also, in the case that the received states by system regarding the buffer set X are all "received" (operation S2255; YES), the main reception master CM activates loading processing as to the buffer set X (operation S2256), and then ends the processing.

In the case that the reception CM is a sub reception master CM, the reception CM (sub reception master CM) which has finished the processing in operation S2224 executes processing of a procedure illustrated in FIG. 21F.

Specifically, the sub reception master CM changes the buffer received state regarding the reception completion notification source CM on the BS management table X to "received" (operation S2262). Thereafter, the sub reception master CM determines whether or not reception of all of the element information regarding the buffer set X has been completed (operation S2263).

In the case that reception of all of the element information regarding the buffer set X has been completed (operation S2263; YES), the sub reception master CM transmits a BS reception completion notification to the main transmission master CM (operation S2264), and then ends the processing. Also, in the case that reception of all of the element information regarding the buffer set X has not been completed (operation S2263; NO), the sub reception master CM ends the processing without transmitting a BS information reception completion notification.

Figure 21G:
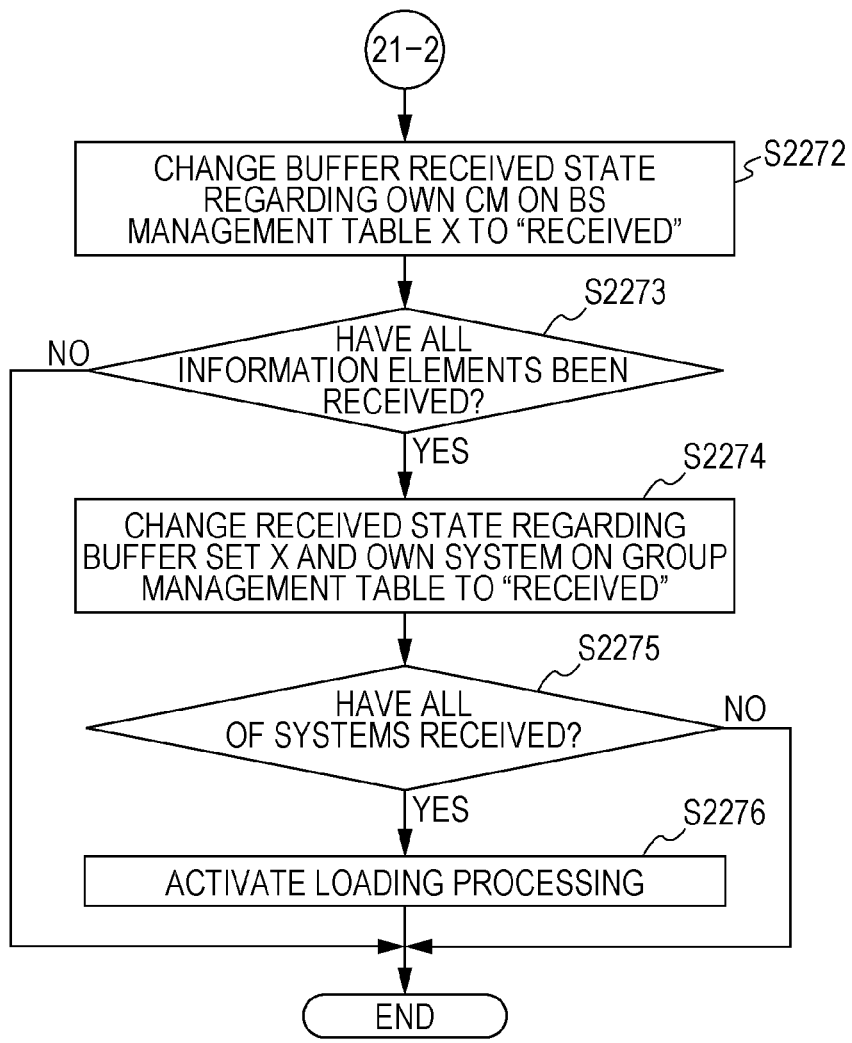
FIG. 21G is a flowchart (Part 7) of the buffer management table and buffer transfer processing.

In the case that the reception CM is a main reception slave CM, the reception CM (main reception slave CM) which has finished the processing in operation S2224 executes processing of a procedure illustrated in FIG. 21G.

Specifically, the main reception slave CM changes the buffer received state regarding the reception completion notification source CM on the BS management table X to "received" (operation S2272). Thereafter, the main reception master CM determines whether or not reception of all of the element information regarding the buffer set X has been completed (operation S2273).

In the case that reception of all of the element information regarding the buffer set X has been completed (operation S2273; YES), the main reception master CM changes the received states regarding the buffer set X and the own system (reception system 0) on the group management table 150 to "received" (operation S2274). Thereafter, the main reception master CM determines whether or not the received states by system regarding the buffer set X are all "received" (operation S2275).

In the case that the received states by system regarding the buffer set X are not all "received" (operation S2275; NO), the main reception master CM then ends the processing. Also, in the case that the received states by system regarding the buffer set X are all "received" (operation S2275; YES), the main reception master CM activates loading processing as to the buffer set X (operation S2276), and then ends the processing.

Loading Processing

FIGS. 22A through 22C illustrate a flowchart of the loading processing.

The main reception master CM which has started the loading processing as to a certain buffer set X first determines whether or not the BS number X to be loaded agrees with the loading BS number on the group management table 150 (operation S2301).

In the case that the BS number X to be loaded agrees with the loading BS number (operation S2301; YES), the main reception master CM requests loading of the buffer X in a form with the BS number X being specified, from the master CMs of other reception systems 100 (operation S2303).

The sub reception master CM from which loading of the buffer X has been requested requests, as illustrated in FIG. 22B, loading of the buffer X in a form with the BS number X being specified, from the slave CMs within the own system 100 (operation S2311). The sub reception slave CMs which have received this request store each data on the buffer X in the storage area within the storage unit 120 that each index information on the buffer management table X indicates (operation S2321). Thereafter, the sub reception slave CMs transmit a loading completion notification to the master CM within the own system 100 (operation S2322).

Also, the sub reception master CMs which have requested for loading of the buffer X from the sub reception slave CMs also store each data on the buffer X in the storage area within the storage unit 120 that each index information on the buffer management table X indicates (operation S2312).

The sub reception master CMs which have finished the processing in operation S2312 monitor that loading of the buffer X by all of the CMs within the own system 100 has been completed (operation S2313; NO). In the case that loading of the buffer by all of the CMs has been completed (operation S2313; YES), the sub reception master CMs transmit a loading completion notification to the main transmission master CM (operation S2314), and then ends the processing.

Also, the main reception master CM which has finished the processing in operation S2303 (FIG. 22A) starts processing of a procedure illustrated in FIG. 22C.

Specifically, the main reception master CM requests loading of the buffer X in a form with the BS number X being specified from the slave CMs within the own system 100 (operation S2331). The sub reception slave CMs which have received this request store each data on the buffer X in the storage area within the storage unit 120 that each index information on the buffer management table X indicates (operation S2341). Thereafter, the sub reception slave CMs transmit a loading completion notification to the master CM within the own system (operation S2342).

Also, the main reception master CM which has requested loading of the buffer X from the sub reception slave CMs also stores each data on the buffer X in the storage area within the storage unit 120 that each index information on the buffer management table X indicates (operation S2332).

The main reception master CM which has finished the processing in operation S2332 stands by for loading of the buffer X by all of the CMs within the own system 100 being completed by monitoring a loading completion notification being transmitted (operation S2333; NO). In the case that loading of the buffer by all of the CMs has been completed (operation S2333; YES), the main reception master CM stands by for loading of the buffer X by all of the reception systems 100 being completed (operation S2305 in FIG. 22A; NO).

In the case that loading of the buffer X by all of the reception systems 100 has been completed (operation S2305; YES), the main transmission master CM changes the loading buffer set number on the group management table 150 in the same procedure as the generation procedure of a new buffer set number (operation S2306).

Thereafter, the main reception master CM determines whether or not the loading waiting state on the buffer management table of the next buffer set (buffer set having a loading buffer set number after change) is "waiting" (operation S2307).

In the case that the loading waiting state on the buffer management table of the next buffer set is "waiting" (operation S2307; YES), the main reception master CM activates loading processing as to the buffer within this buffer set (operation S2308).

Next, the main reception master CM activates unloading processing as to the buffer set with loading being completed (operation S2309), and then ends the processing.

Unloading Processing

Figure 23A:
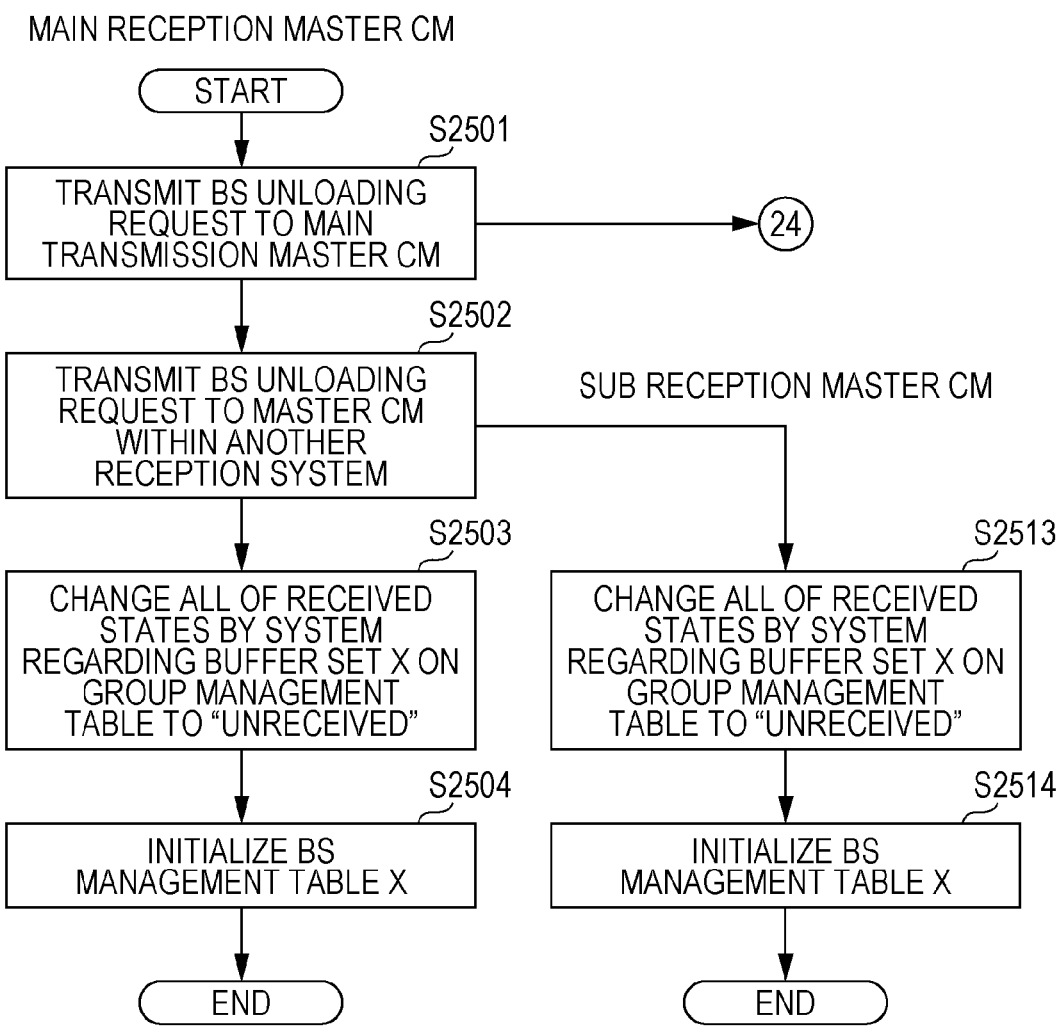
FIG. 23A is a flowchart (Part 1) of unloading processing.
Figure 23B:
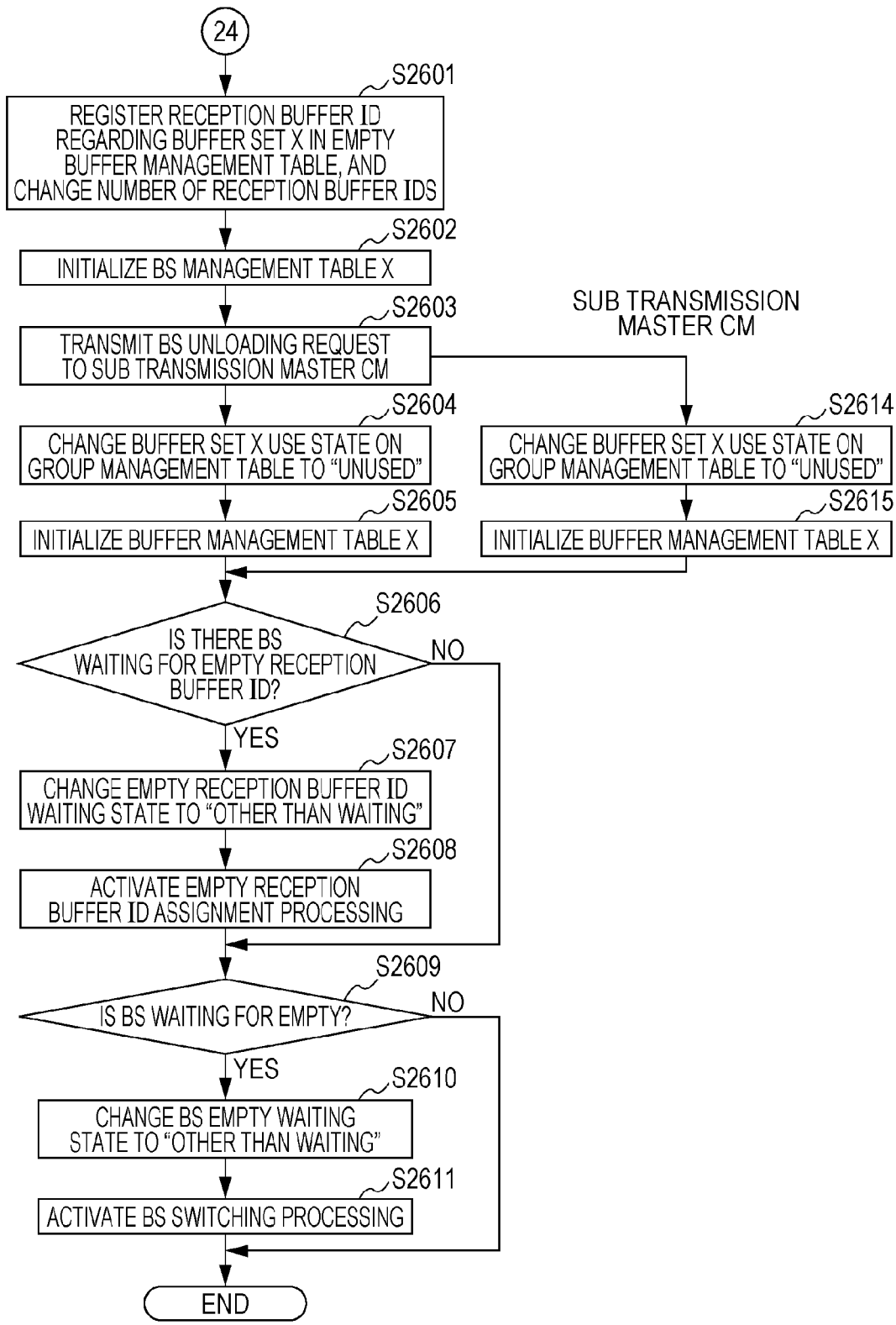
FIG. 23B is a flowchart (Part 2) of the unloading processing.

FIGS. 23A and 23B illustrate a flowchart of unloading processing.

As illustrated in FIG. 23A, the main reception master CM which has started the unloading processing as to a certain buffer set X first transmits a BS unloading request with a BS number X being set as a parameter to the main transmission master CM (operation S2501).

Also, the main reception master CM transmits a BS unloading request to masters CM within other reception systems (operation S2502).

Thereafter, the main reception master CM changes all of the received states by system regarding the buffer set X on the group management table 150 to "unreceived" (operation S2503). Next, the main reception master CM initializes the BS management table X (operation S2504). Specifically, in this operation S2504, the main reception master CM initializes the buffer set received state and loading waiting state on the BS management table X to "unreceived" and "other than waiting", respectively. Also, in operation S2504, the main reception master CM initializes each reception buffer ID, each transmission buffer ID, each buffer management table received state, and each buffer received state on the BS management table X to "invalid", "invalid", "unreceived", and "unreceived", respectively.

The sub reception master CMs which have received a BS unloading request also change all of the received states by system regarding the buffer set X on the group management table 150 to "unreceived" (operation S2513), and initializes the BS management table X (operation S2514).

On the other hand, the main transmission master CM which has received the BS unloading request first, as illustrated in FIG. 23B, in operation S2601, registers each reception buffer ID set on the BS management table X in the empty reception buffer table. Also, the main transmission master CM also performs processing for updating the number of empty buffer IDs on the empty reception buffer table.

Next, the main transmission master CM initializes the BS management table X (operation S2602), and then transmits a BS unloading request with the BS number X being set as a parameter to the sub transmission master CMs (operation S2603). The sub transmission master CMs which have received this BS unloading request changes the buffer set X use state on the group management table 150 to "unused" (operation S2614), and initializes the buffer management table X (operation S2615).

Also, the main transmission master CM which has finished the processing in operation S2603 changes the buffer set X use state on the group management table 150 to "unused" (operation S2604), and initializes the buffer management table X (operation S2605).

Thereafter, the main transmission master CM determines whether or not there is a buffer set with the empty reception buffer ID waiting state being "waiting" (operation S2606).

In the case that there is such a buffer set (operation S2606; YES), the main transmission master CM changes the empty reception buffer ID waiting state regarding this buffer set to "other than waiting" (operation S2607). The main transmission master CM then activates the empty reception buffer ID assignment processing as to this buffer set (operation S2608).

The main transmission master CM which has finished the processing in operation S2608 determines whether or not the BS waiting state on the group management table 150 is "empty waiting" (operation S2609).

In the case that the BS empty waiting state is "empty waiting" (operation S2609; YES), the main transmission master CM changes the BS empty waiting state to "other than waiting" (operation S2610). The main transmission master CM then activates the BS switching processing (operation S2611), and then ends this unloading processing.

Buffer Set Periodical Switching Processing

FIG. 24 illustrates a flowchart of buffer set periodical switching processing.

This buffer set periodical switching processing is processing that the main transmission master CM executes (see FIG. 4B).

As illustrated in FIG. 24, the main transmission master CM which has started the buffer set periodical switching processing first determines whether or not the negotiation state on the group management table 150 is "after negotiation" (operation S2001). In the case that the negotiation state is not "after negotiation" (operation S2001; NO), the main transmission master CM then ends this buffer set periodical switching processing.

On the other hand, in the case that the negotiation state is "after negotiation" (operation S2001; YES), the main transmission master CM sets the next execution point-in-time (date) of the own processing based on the BS automatic switching time set in the group management table 150 (operation S2002). Thereafter, the main transmission master CM determines whether or not the BS periodical switching processing activated state on the group management table 150 is "activated" (operation S2003).

In the case that the BS periodical switching processing activated state is not "activated" (operation S2003; NO), the main transmission master CM changes the BS periodical switching processing activated state to "activated" (operation S2004), and then ends this buffer set periodical switching processing. On the other hand, in the case that the BS periodical switching processing activated state is "activated" (operation S2003; YES), the main transmission master CM activates the BS switching processing as to a buffer set agreeing with the stored BS number at that time (operation S2005), and then ends this buffer set periodical switching processing.

As described above in detail, the SS (Storage System) 100 according to the present embodiment is a system for performing asynchronous remote copy by switching a BS (Buffer Set) in the same way as with the existing SS 200 described with reference to FIG. 1. However, the SS 100 is a device capable of requesting switching of the BS from another SS 100 when switching of the BS within the own device has to be performed, also a device which switches the BS when switching of the BS is requested from another SS 100.

Accordingly, in the event of employing the SS 100 according to the present embodiment, a SS network can be constructed wherein all of the transmission systems 100 serve as one storage system, and copy with sequentiality of writing data by the host 300 is performed on multiple reception systems 100 on the remote location side. Moreover, as can be apparent from the function of the above-mentioned main transmission/reception system 100, the SS 100 is a device (system) capable of remote copy even when only one SS 100 is connected to the host 300. Therefore, according to the SS 100 according to the present embodiment, the storage capacity on the host 300 side can be increased in a form where replacement of an SS 100 already connected to the host 300 is unneeded.

Modification

With the SS (Storage System) 100 according to the above-mentioned embodiment, various modifications can be made. For example, a CM 110 which has found out shortage in buffer capacity can transform the SS 100 into a device which performs the processing in FIG. 17B (and FIG. 17A). Also, the SS 100 can also be transformed into a device whereby a user can set the buffer size.

Also, the buffer management table (FIG. 8) can also be transformed into a table where a check code with 8 bytes or so is stored regarding each index information, for example. Also, the size of the buffer management table can also be changed to the same size as with the buffer. Note that adjustment of the size of the buffer management table can readily be performed by adjusting the contents and number of index information to be stored in the buffer management table.

Further, it goes without saying that the SS 100 may be transformed into a device of which the specific hardware configuration differs from the above (e.g., a device in which only one CM 110 can be installed), or the configurations/usages of the tables other than the buffer management table may differ from the above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage system to be connected to a host and another storage system for back up, comprising:
   a first storage unit;
   a second storage unit including updated data storage areas; and
   a controller configured to receive a write request for updated data from the host for transmission of the updated data to the first storage unit, the controller executing a process including
      determining, when receiving the write request for the updated data, whether there is a free area having capacity enough to store the updated data in a storage area to be processed that is one of the updated data storage areas,
   wherein when determining that there is the free area,
      storing control information into the second storage unit, the control information including first writing destination information indicating a writing area of the updated data within the first storage unit, second writing destination information indicating a writing area of the updated data within the another storage system for backup and identification information of one of the updated data storage areas used as the storage area to be processed, and
      writing the updated data into the first storage unit, and
   wherein when determining that there is not the free area,
      changing the storage area to be processed to another one of the updated data storage areas within the second storage unit,
      storing the control information into the second storage unit,
      writing the updated data into the first storage unit, and instructing change of a storage area to be processed to another storage system to be connected to the host, reading out the updated data that is written in the first storage unit to each of the updated data storage areas of the second storage unit in accordance with the control information stored in the second storage unit in asynchronous with processing of the write request from the host, and transmitting the updated data on the updated data storage areas that is read out and the second writing destination information relating to the updated data to the another storage system for backup.

2. The storage system according to claim 1, wherein the controller changes, when change of the storage area to be processed is instructed from the another storage system to be connected to the host, the storage area to be processed to another one of the updated data storage areas within the second storage unit.

3. The storage system according to claim 1, wherein the controller changes the storage area to be processed to another one of the updated data storage areas within the second storage unit, when predetermined period of time elapses, and instructs the other storage system to be connected to the host to change a storage area to be processed.

4. A storage system to be connected to a host and another storage system for backup, comprising:
a first storage unit;
a second storage unit including storage area sets each including an index information storage area and an updated data storage area; and
a controller configured to receive a write request for updated data from the host for transmission of the updated data to the first storage unit, the controller executing a process including
determining, when receiving the write request for the updated data, whether there is a free area having capacity enough for storing to store the updated data into the updated data storage area in a storage area set to be processed that is one of the storage area sets,
wherein when determining that there is the free area,
storing write request copy control information into the second storage unit, the write request copy control information including first writing destination information indicating a writing area of the updated data within the first storage unit and storage area specifying information indicating a storage area, in which the updated data is to be stored, within the updated data storage area included in the storage area set to be processed,
storing index information indicating a writing area of the updated data within the another storage system for backup into the index information storage area included in the storage area set to be processed, and
writing the updated data into the first storage unit, and
when determining that there is not the free area,
changing the storage area set to be processed to another one of the storage area sets,
storing the write request copy control information into the second storage unit,
storing the index information into the index information storage area included in the storage area set to be processed,
writing the updated data in the first storage unit, and
instructing change of a storage area set to be processed to another storage system connected to the host, reading out the updated data that is written in the first storage unit to the updated data storage area of the second storage unit in accordance with the write request copy control information on the second storage unit in asynchronous with processing of the write request, and transmitting the updated data on the updated data storage area that is read out and the index information on the index information storage area, which are included in one of the storage area sets, to the another storage system for backup.

5. A storage system network, comprising:
host-side storage systems connected to a host; and
storage systems for backup, the host-side storage systems and the storage systems for backup being connected to communicate with each other, the host-side storage systems each including
a first storage unit;
a second storage unit including updated data storage areas; and
a controller configured to receive a write request for updated data from the host for transmission to the first storage unit, the controller executing a process including
determining, when receiving the write request for the updated data, whether there is a free area having capacity enough to store the updated data in a storage area to be processed that is one of the updated data storage areas,
wherein when determining that there is the free area,
storing control information into the second storage unit, the control information including first writing destination information indicating a writing area of the updated data within the first storage unit, second writing destination information indicating a writing area of the updated data within each of the storage systems for backup and identification information of one of the updated data storage areas used as the storage area to be processed,
writing the updated data into the first storage unit, and
when determining that there is not the free area,
changing the storage area to be processed to another one of the updated data storage areas within the second storage unit,
storing the control information into the second storage unit,
writing the updated data into the first storage unit, and
instructing change of a storage area to be processed to others of the host-side storage systems,
reading out the updated data that is written in the first storage unit to each of the updated data storage areas of the second storage unit in accordance with the control information stored in the second storage unit in asynchronous with processing of the write request from the host, and
transmitting the updated data on the updated data storage areas that is read out and the second writing destination information relating to the updated data to each of the storage systems for backup, and
each of the storage systems for backup including
a third storage unit, and
a second controller configured to receive the updated data and the second writing destination information transmitted from the host-side storage systems each corresponding to a storage system for backup, and to write the received updated data in a storage area within the third storage unit that the received second writing destination information indicates.

6. A storage system network, comprising:

host-side storage systems connected to a host; and storage systems for backup, the host-side storage systems and the storage systems for backup being connected to communicate with each other, the host-side storage systems each including a first storage unit;

a second storage unit including storage area sets each including index information storage area and an updated data storage area; and a controller configured to receive a write request for updated data from the host for transmission to the first storage unit, the controller executing a process including determining, when receiving the write request for updated data, whether there is a free area having capacity enough to store the updated data into the updated data storage area in a storage area set to be processed that is one of the storage area sets, wherein when determining that there is the free area, storing write request copy control information into the second storage unit, the write request copy control information including first writing destination information indicating a writing area of the updated data within the first storage unit and storage area specifying information indicating a storage area, in which the updated data is to be stored, within the updated data storage area included in the storage area set to be processed, storing index information indicating a writing area of the updated data within each of the storage systems for backup in the index information storage area included in the storage area set to be processed, and writing the updated data in the first storage unit, and when determining that there is not the free area, changing the storage area set to be processed to another one of the storage area sets, storing the write request copy control information in the second storage unit, storing the index information in the index information storage area included in the storage area set to be processed, writing the updated data in the first storage unit, and instructing change of a storage area set to be processed to others of the host-side storage systems, reading out the updated data that is written in the first storage unit to the updated data storage area of the second storage unit in accordance with the write request copy control information on the second storage unit in asynchronous with the write request processing, and transmitting the updated data on the updated data storage area of which readout is completed and the index information on the index information storage area, which are included in one of the storage area sets, to each of the storage systems for backup, each of the storage systems for backup including a third storage unit, and a second controller configured to receive the updated data and the index information transmitted from the host-side storage systems each corresponding to a storage system for backup, and to write the received updated data in a storage area within the third storage unit that the received index information indicates.

* * * * *

UNITED STATES PATENT AND TRADEMARK OFFICE
CERTIFICATE OF CORRECTION

| | | |
|---|---|---|
| PATENT NO. | : 8,806,163 B2 | Page 1 of 1 |
| APPLICATION NO. | : 13/595394 | |
| DATED | : August 12, 2014 | |
| INVENTOR(S) | : Takashi Kawada et al. | |

It is certified that error appears in the above-identified patent and that said Letters Patent is hereby corrected as shown below:

In the Claims

Column 33, Line 38, In Claim 4, after "enough" delete "for storing".

Signed and Sealed this
Fourth Day of November, 2014

Michelle K. Lee
*Deputy Director of the United States Patent and Trademark Office*